United States Patent
Behforooz et al.

(10) Patent No.: US 8,751,582 B1
(45) Date of Patent: Jun. 10, 2014

(54) MANAGING PRESENCE SUBSCRIPTIONS FOR MESSAGING SERVICES

(75) Inventors: Reza Behforooz, Seattle, WA (US); Gary Steven Burd, Kirkland, WA (US); David Bau, Gladwyne, PA (US); Jonathan David Perlow, Seattle, WA (US)

(73) Assignee: Google Inc., Mountain View, CA (US)

( * ) Notice: Subject to any disclaimer, the term of this patent is extended or adjusted under 35 U.S.C. 154(b) by 968 days.

(21) Appl. No.: 11/210,227

(22) Filed: Aug. 22, 2005

(51) Int. Cl.
*G06F 15/16* (2006.01)

(52) U.S. Cl.
USPC .................................................. 709/206

(58) Field of Classification Search
USPC .................................................. 709/206
See application file for complete search history.

(56) References Cited

U.S. PATENT DOCUMENTS

| | | | |
|---|---|---|---|
| 5,179,700 A | 1/1993 | Aihara et al. | |
| 5,227,771 A | 7/1993 | Kerr et al. | |
| 5,870,090 A | 2/1999 | Takai et al. | |
| 5,889,474 A * | 3/1999 | LaDue | 340/825.49 |
| 5,940,077 A | 8/1999 | Amro | |
| 6,072,875 A | 6/2000 | Tsudik | |
| 6,141,008 A | 10/2000 | Bloomfield | |
| 6,240,402 B1 | 5/2001 | Lynch-Aird | |
| 6,269,369 B1 | 7/2001 | Robertson | |
| 6,385,619 B1 | 5/2002 | Eichstaedt et al. | |
| 6,414,698 B1 | 7/2002 | Lovell et al. | |
| 6,487,584 B1 | 11/2002 | Bunney | |
| 6,549,937 B1 | 4/2003 | Auerbach et al. | |
| 6,584,471 B1 | 6/2003 | Maclin et al. | |
| 6,725,461 B1 | 4/2004 | Dougherty et al. | |
| 6,751,657 B1 | 6/2004 | Zothner | |
| 6,804,558 B2 * | 10/2004 | Haller et al. | 607/30 |
| 6,813,489 B1 | 11/2004 | Wu et al. | |
| 6,829,646 B1 | 12/2004 | Philyaw et al. | |
| 6,832,245 B1 | 12/2004 | Isaacs et al. | 709/206 |
| 6,856,801 B1 | 2/2005 | Arbenz | |
| 6,901,559 B1 | 5/2005 | Blum et al. | |
| 6,909,439 B1 | 6/2005 | Amro et al. | |
| 6,925,605 B2 | 8/2005 | Bates et al. | |
| 6,965,855 B1 | 11/2005 | Burbridge et al. | |
| 6,968,179 B1 | 11/2005 | De Vries | |
| 7,007,239 B1 | 2/2006 | Hawkins et al. | |
| 7,133,859 B1 | 11/2006 | Wong | |
| 7,149,773 B2 * | 12/2006 | Haller et al. | 709/203 |
| 7,216,302 B2 | 5/2007 | Rodden et al. | |
| 7,234,117 B2 | 6/2007 | Zaner et al. | |
| 7,243,075 B1 | 7/2007 | Shaffer et al. | |
| 7,281,215 B1 | 10/2007 | Canfield et al. | |
| 7,305,398 B2 | 12/2007 | Teicher | |

(Continued)

OTHER PUBLICATIONS

"Extensible Messaging and Presence Protocol (XMPP): Instant Messaging and Presence," P. Sanit-Andre, Ed., Jabber Software Foundation, Oct. 2004, pp. 1-90.

*Primary Examiner* — Thuong Nguyen
*Assistant Examiner* — Tariq Najee-Ullah
(74) *Attorney, Agent, or Firm* — Morgan, Lewis & Bockius LLP

(57) ABSTRACT

Presence subscriptions for messaging services are managed by automatically subscribing contacts to a user's contact lists based one or more rules, subscription states and contact types. In some embodiments, presence subscriptions are managed by: identifying a set of contacts with respect to an identified user; applying subscription rules to the contacts; selecting a subset of contacts based on one or more subscription rules; and automatically establishing presence subscriptions for the subset of contacts.

24 Claims, 13 Drawing Sheets

(56) References Cited

U.S. PATENT DOCUMENTS

| | | |
|---|---|---|
| 7,313,760 B2 | 12/2007 | Grossman et al. |
| 7,343,365 B2 | 3/2008 | Farnham et al. |
| 7,346,694 B2 | 3/2008 | Philyaw et al. |
| 7,360,174 B2 | 4/2008 | Grossman et al. |
| 7,370,290 B2 | 5/2008 | Grossman et al. |
| 7,379,848 B2 | 5/2008 | Yu et al. |
| 7,506,026 B1 | 3/2009 | Lance et al. |
| 7,580,363 B2 | 8/2009 | Sorvari et al. |
| 7,680,895 B2 | 3/2010 | Perlow et al. |
| 7,685,236 B1 | 3/2010 | Harik et al. |
| 7,698,380 B1 | 4/2010 | Amidon et al. |
| 7,716,287 B2 | 5/2010 | Appelman et al. |
| 7,730,010 B2 | 6/2010 | Kishore et al. |
| 7,747,631 B1 | 6/2010 | Puzicha et al. |
| 7,769,622 B2 | 8/2010 | Reid et al. |
| 7,783,644 B1 | 8/2010 | Petrou et al. |
| 8,238,531 B2 | 8/2012 | Strope et al. |
| 8,364,605 B2 | 1/2013 | Rosenthal et al. |
| 8,385,536 B2 | 2/2013 | Whitehead |
| 2001/0051787 A1* | 12/2001 | Haller et al. ............... 604/66 |
| 2002/0013613 A1* | 1/2002 | Haller et al. ............... 607/60 |
| 2002/0019825 A1 | 2/2002 | Smiga et al. |
| 2002/0052539 A1* | 5/2002 | Haller et al. ............... 600/300 |
| 2002/0059425 A1 | 5/2002 | Belfiore et al. |
| 2002/0073207 A1 | 6/2002 | Widger et al. |
| 2002/0077116 A1* | 6/2002 | Havinis et al. ............... 455/456 |
| 2002/0082665 A1* | 6/2002 | Haller et al. ............... 607/60 |
| 2002/0087522 A1 | 7/2002 | MacGregor et al. |
| 2002/0116336 A1* | 8/2002 | Diacakis et al. ............... 705/51 |
| 2002/0116461 A1* | 8/2002 | Diacakis et al. ............... 709/204 |
| 2002/0120687 A1* | 8/2002 | Diacakis et al. ............... 709/204 |
| 2002/0120774 A1* | 8/2002 | Diacakis ............... 709/245 |
| 2002/0178022 A1* | 11/2002 | Anderson et al. ............... 705/1 |
| 2002/0184321 A1 | 12/2002 | Fishman et al. |
| 2003/0018704 A1* | 1/2003 | Polychronidis et al. ...... 709/202 |
| 2003/0041048 A1* | 2/2003 | Balasuriya ............... 707/1 |
| 2003/0065721 A1 | 4/2003 | Roskind |
| 2003/0073440 A1* | 4/2003 | Mukherjee et al. ........... 455/435 |
| 2003/0119540 A1 | 6/2003 | Mathis |
| 2003/0208545 A1 | 11/2003 | Eaton et al. |
| 2004/0032340 A1 | 2/2004 | Lingafeldt et al. |
| 2004/0053605 A1 | 3/2004 | Martyn et al. |
| 2004/0056901 A1 | 3/2004 | March et al. |
| 2004/0059781 A1* | 3/2004 | Yoakum et al. ............... 709/204 |
| 2004/0088221 A1 | 5/2004 | Katz et al. |
| 2004/0102982 A1 | 5/2004 | Reid et al. |
| 2004/0113952 A1 | 6/2004 | Randall |
| 2004/0119732 A1 | 6/2004 | Grossman et al. |
| 2004/0119760 A1 | 6/2004 | Grossman et al. |
| 2004/0162883 A1* | 8/2004 | Oreizy et al. ............... 709/207 |
| 2004/0172455 A1 | 9/2004 | Green et al. |
| 2004/0172456 A1 | 9/2004 | Green et al. |
| 2004/0196315 A1 | 10/2004 | Swearingen et al. |
| 2004/0210844 A1 | 10/2004 | Pettinati et al. ............... 715/708 |
| 2004/0243941 A1 | 12/2004 | Fish |
| 2004/0260749 A1 | 12/2004 | Trossen et al. |
| 2005/0076013 A1 | 4/2005 | Hilbert et al. |
| 2005/0080855 A1 | 4/2005 | Murray |
| 2005/0080856 A1 | 4/2005 | Kirsch |
| 2005/0091272 A1 | 4/2005 | Smith et al. |
| 2005/0130635 A1 | 6/2005 | Arbenz |
| 2005/0165920 A1 | 7/2005 | Kerr et al. ............... 709/223 |
| 2005/0198131 A1 | 9/2005 | Appelman et al. |
| 2005/0198172 A1* | 9/2005 | Appelman et al. ............ 709/206 |
| 2005/0203929 A1* | 9/2005 | Hazarika et al. ............... 707/100 |
| 2005/0265296 A1* | 12/2005 | Zhang et al. ................... 370/338 |
| 2005/0267944 A1 | 12/2005 | Little, II |
| 2006/0004585 A1* | 1/2006 | Shukosky et al. ................. 705/1 |
| 2006/0010104 A1 | 1/2006 | Pettinati et al. |
| 2006/0031366 A1 | 2/2006 | Dolph |
| 2006/0031772 A1 | 2/2006 | Valeski |
| 2006/0035632 A1 | 2/2006 | Sorvari et al. |
| 2006/0036689 A1* | 2/2006 | Buford et al. .................. 709/206 |
| 2006/0047747 A1 | 3/2006 | Erickson et al. |
| 2006/0069727 A1 | 3/2006 | Fuller et al. |
| 2006/0074932 A1 | 4/2006 | Fong et al. |
| 2006/0084478 A1 | 4/2006 | Erlichmen |
| 2006/0085415 A1 | 4/2006 | Jian |
| 2006/0085752 A1 | 4/2006 | Beadle et al. |
| 2006/0101266 A1 | 5/2006 | Klassen et al. |
| 2006/0117380 A1 | 6/2006 | Tachizawa et al. |
| 2006/0136836 A1 | 6/2006 | Clee et al. |
| 2006/0161853 A1 | 7/2006 | Chen et al. |
| 2006/0173963 A1 | 8/2006 | Roseway et al. |
| 2006/0184896 A1 | 8/2006 | Foucher et al. |
| 2006/0209690 A1 | 9/2006 | Brooke |
| 2006/0229896 A1 | 10/2006 | Rosen et al. |
| 2006/0241955 A1 | 10/2006 | Bank |
| 2006/0259956 A1* | 11/2006 | Diacakis et al. ................... 726/2 |
| 2006/0271870 A1 | 11/2006 | Anwar |
| 2006/0277282 A1 | 12/2006 | Christensen et al. |
| 2007/0027919 A1 | 2/2007 | Mastel |
| 2007/0055742 A1 | 3/2007 | Hebert et al. |
| 2007/0118809 A1 | 5/2007 | Ozugur et al. |
| 2007/0129112 A1 | 6/2007 | Tarn |
| 2007/0135110 A1 | 6/2007 | Athale et al. |
| 2007/0198696 A1* | 8/2007 | Morris .......................... 709/224 |
| 2007/0198725 A1* | 8/2007 | Morris .......................... 709/227 |
| 2008/0022215 A1 | 1/2008 | Lee et al. |
| 2008/0040687 A1 | 2/2008 | Randall |
| 2008/0046281 A1 | 2/2008 | Teicher |
| 2008/0046282 A1 | 2/2008 | Teicher |
| 2008/0046803 A1 | 2/2008 | Beauchamp et al. |
| 2008/0207271 A1 | 8/2008 | Krutik et al. |
| 2008/0256107 A1 | 10/2008 | Banga et al. |
| 2008/0270939 A1 | 10/2008 | Mueller |
| 2009/0089316 A1 | 4/2009 | Kogan et al. |
| 2009/0106059 A1 | 4/2009 | Megiddo et al. |
| 2009/0111447 A1 | 4/2009 | Nurmi |
| 2010/0010826 A1 | 1/2010 | Rosenthal et al. |
| 2010/0042600 A1 | 2/2010 | Orr et al. |
| 2010/0062753 A1 | 3/2010 | Wen et al. |
| 2010/0070345 A1 | 3/2010 | Abelow |
| 2010/0082693 A1 | 4/2010 | Hugg et al. |
| 2010/0191740 A1 | 7/2010 | Lu et al. |
| 2010/0223211 A1 | 9/2010 | Johnson et al. |
| 2010/0273459 A1 | 10/2010 | Stern et al. |
| 2010/0290603 A1 | 11/2010 | Gemayel et al. |
| 2010/0306185 A1 | 12/2010 | Smith et al. |
| 2011/0022602 A1 | 1/2011 | Luo et al. |
| 2011/0196876 A1 | 8/2011 | Seeger et al. |
| 2011/0197140 A1 | 8/2011 | Seeger et al. |
| 2011/0235790 A1 | 9/2011 | Strope et al. |
| 2012/0045049 A1 | 2/2012 | Yoakum |
| 2012/0047129 A1 | 2/2012 | Redstone et al. |
| 2012/0102126 A1 | 4/2012 | Murphy et al. |

\* cited by examiner

MANAGING PRESENCE SUBSCRIPTIONS FOR MESSAGING SERVICES

TECHNICAL FIELD

The disclosed embodiments relate generally to messaging services, and more particularly to managing presence subscriptions for messaging services.

RELATED APPLICATION

This application is related to U.S. application Ser. No. 11/180,035, filed Jul. 11, 2005, entitled "Presenting Quick List of Contacts to Communication Application User," which application is incorporated by reference herein in its entirety.

BACKGROUND

Instant messaging (IM) is an Internet Protocol-based application that provides convenient communication between people using a variety of different device types (e.g., computers, mobile phones, etc.). An IM service can be either device-based or network-based.

In a device-based system, the user information is located on the device used to access the system. The user downloads a client application to the device (e.g., a computer, mobile phone). The user's list of contacts and other preferences specific to the user are saved on that device. If the user accesses the system from multiple devices, the same user information will have to be created on each device. If that information is changed, or the user accesses the system as a guest from an infrequently user device, the user information may need to be manually changed on both devices.

In a network-based system, the user information is stored on a network-based server, so users have access to the same customized services and information, regardless of how they access the system. Client software can be loaded on devices used to access the service, but the same contact list, addresses, and other personal information will be available whenever users log into the system. If a change is made to information, that change will then affect all the devices that user uses. Because this information is located centrally, users also have the option of updating their own information for all other users. For example, if a user changes her e-mail address, she can make that change in the system. Then everyone who has the user on their contact list will automatically have their contact lists updated the next time they log into the system. In contrast to the device-based system, the network-based system offers true integrated communications across multiple device types.

In conventional IM-enabled devices, each contact's presence must be manually subscribed and managed, which can be cumbersome. And since there can be several states of presence subscription, the task of managing a large number of presence subscriptions can be overwhelming to most users.

Therefore, what is needed is a system and method for managing presence subscriptions for messaging services, such as IM.

SUMMARY

Presence subscriptions for messaging services are managed by automatically subscribing contacts to a user's contact lists based one or more rules, subscription states and/or contact types.

In some embodiments, a method of managing presence subscriptions for messaging services includes: identifying a set of contacts with respect to an identified user; applying subscription rules to the contacts; selecting a subset of contacts based on one or more subscription rules; and automatically establishing presence subscriptions for the subset of contacts.

In some embodiments, a computer-readable medium includes instructions, which, when executed by a process in a system for managing presence subscriptions, causes the processor to perform the operations of: identifying a set of contacts with respect to an identified user; applying subscription rules to the contacts; selecting a subset of contacts based on one or more subscription rules; and automatically establishing presence subscriptions for the subset of contacts.

DESCRIPTION OF EMBODIMENTS

Messaging Network Overview

Figure 1A:
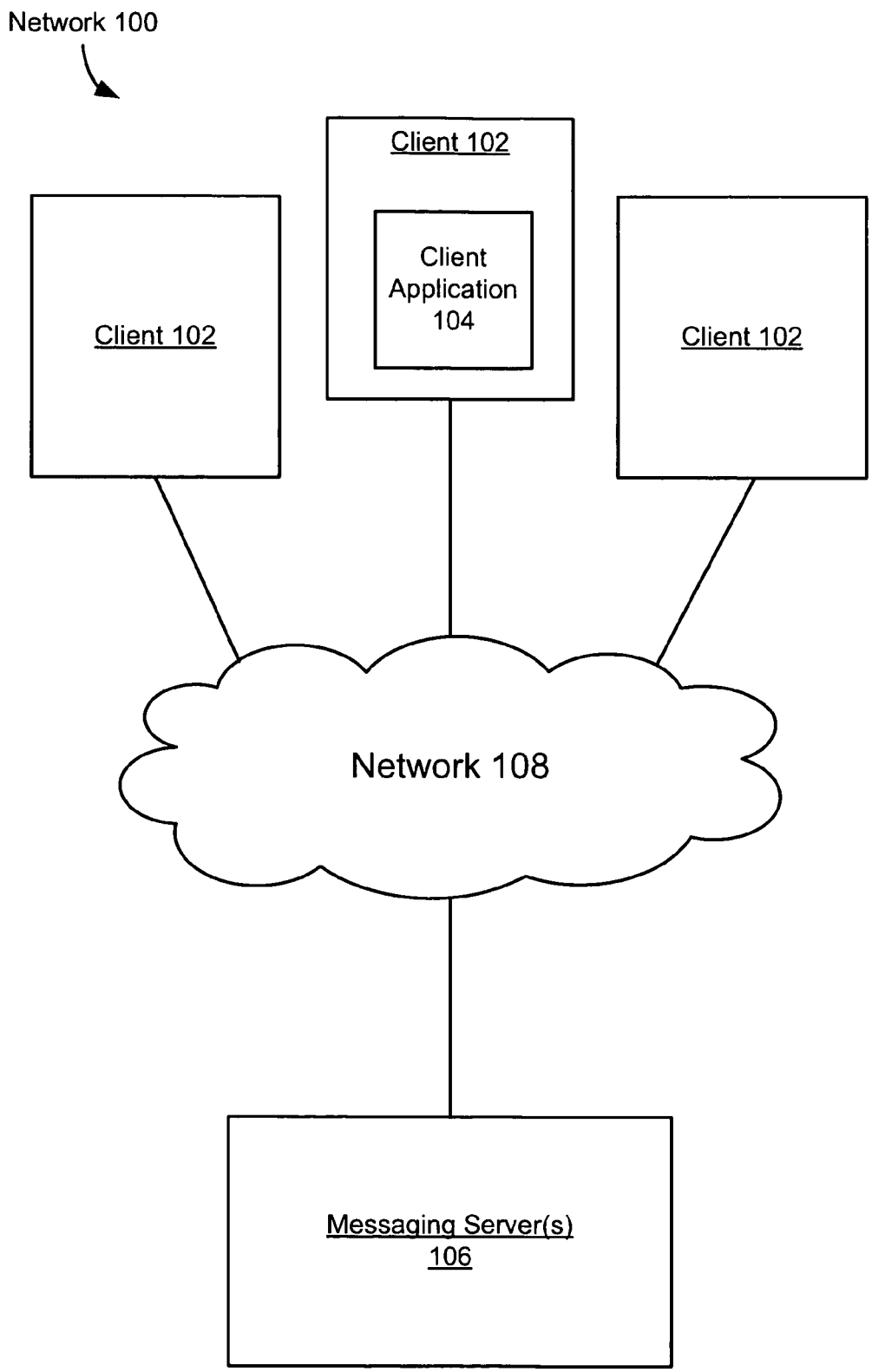
FIGS. 1A-1B are block diagrams illustrating networks, according to some embodiments of the invention.
Figure 1B:
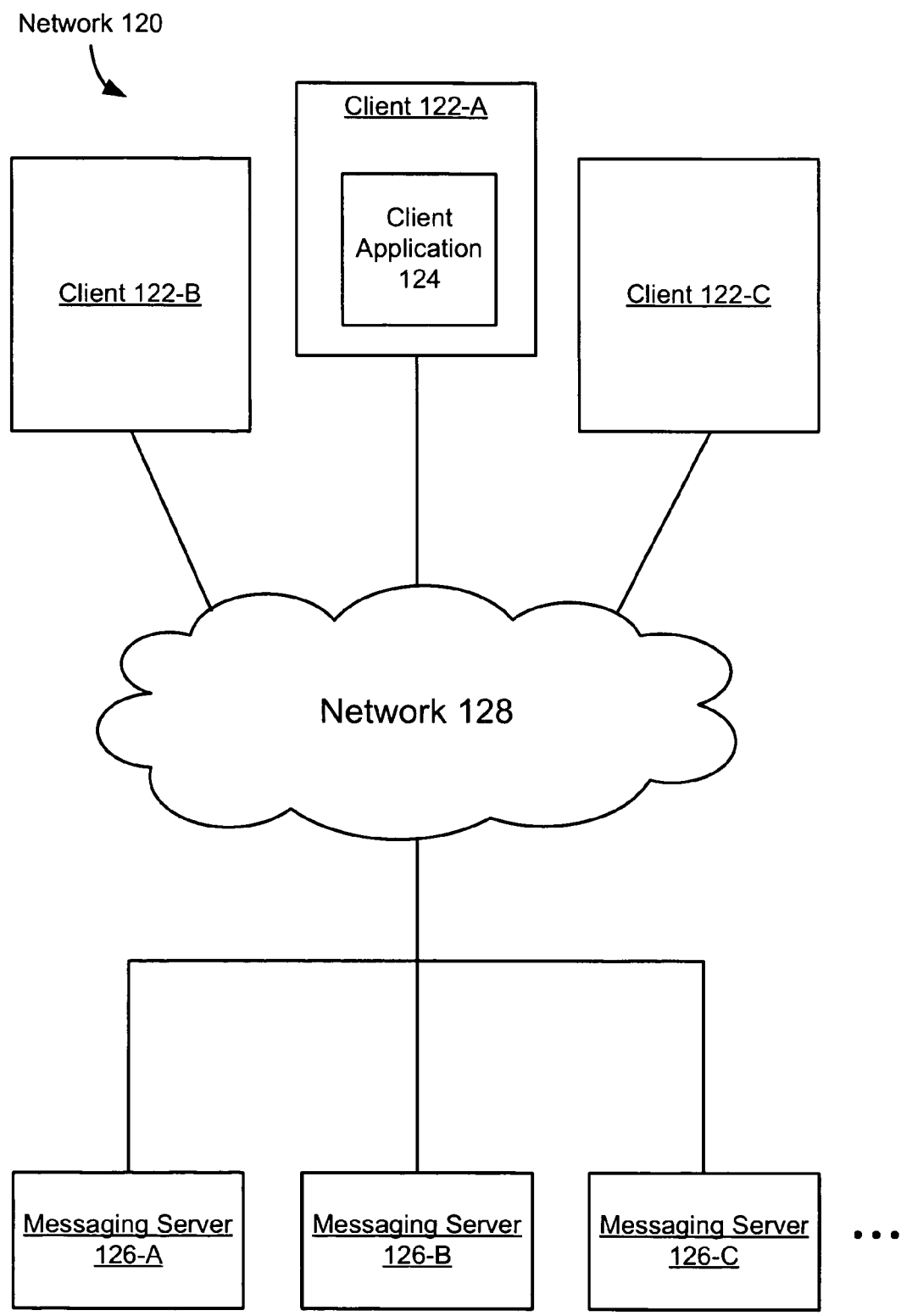

FIGS. 1A and 1B are block diagrams illustrating networks, according to some embodiments of the invention. In FIG. 1A, the network 100 includes one or more clients 102, one or more messaging servers 106, and one or more networks 108 that couple these components. The client 102 may be any communications device or computer, including but not limited to, desktop computers, laptop computers, personal digital assistants (PDAs), mobile phones, network terminals, and so forth. The network(s) 108 may include, without limitation, local area networks (LAN), wide area networks (WAN), wired or wireless networks, mobile phone networks, and the Internet.

The client 102 includes a client application 104. The client application 104 may be any program, module, instructions, or the like, that sends and receives documents between clients 102. A document may be any type of machine-readable data, which may include any combination of text, graphics, video, audio, etc. In some embodiments, the client application 104 is a communication application such as messaging application and the documents are messages. Examples of messages include, without limitation, email messages and instant messaging messages. Examples of messaging applications include, without limitation, email applications and instant messaging applications. For convenience of explanation, the description below will describe the clients and messaging servers 106 as sending and receiving messages. Alternately, the client application may be a communication application such as a telephone or VoIP (voice over IP) application for handling telephone or audio communications.

One or more messaging servers 106 provide messaging services to clients 102. The messaging servers 106 store information associated with the users of the service, user status information, and address books of users, further details of which are described below, in relation to FIGS. 4A-4D. In some embodiments, the messaging servers 106 store and relay messages to and from clients 102. In some other embodiments, the messaging servers 106 provide information to be used by a client to directly connect to another client. The messaging servers 106 and clients 102 may utilize any of a plurality of messaging protocols, including but not limited to Simple Mail Transfer Protocol (SMTP), Post Office Protocol version 3(POP3), Internet Relay Chat (IRC), OSCAR, JABBER, etc.

In some embodiments, the messaging servers 106 monitor and manage the status information of the users of the messaging service. Whenever a client application associated with a user of the messaging service is not running on a client or is running but is otherwise not in communication with the messaging servers 106, the user is considered to be offline. If the client application is running and is in communication with the messaging servers 106, the user is considered to be online. Whenever a user goes from offline to online, the client application 104 sends a message to the messaging servers 106 announcing the change in status. The messaging servers 106 update the status information associated with the user to reflect the status change. The messaging servers 106 may forward the status of a user A to a client application associated with a user B who is interested in the status of user A. In some embodiments, the status of user A is forwarded to user B and other users by a broadcast or multicast message. In some embodiments, presence subscriptions govern which user's receive status information (also called online presence information) associated which each other user. For instance, a particular user B will receive status information only for those other users for whom user B has a presence subscription.

The status information monitored by the messaging servers 106 may be further refined. One or more predefined statuses may be provided and serve as a default set of statuses. One or more status messages, which are text strings that describe the status in further detail, may be associated with the predefined statuses. The client application may be set to any one of the predefined statuses by user intervention or as an automatic response to particular events. The predefined statuses serve to indicate in greater detail the user's willingness and/or availability to exchange messages with other users.

In some embodiments, the predefined user statuses may include "active," "idle," "busy," "chatty," and offline. "Active" means that the user is available to send and/or receive messages. "Idle" (or "away") means that the user has not been actively using the client for at least a specified amount of time, and by implication, is away from the client. "Busy" means that the user is preoccupied with other matters and is not available for sending and/or receiving messages. "Chatty" means that the user is actively sending and/or receiving messages and may be willing to send and/or receive more. "Offline" means that the user is offline, as described above. A user that is "active," "idle," "busy," or "chatty" is also online because the client application 104 is running and in communication with the messaging servers 106.

It should be appreciated that the statuses described above are merely exemplary. Additional and/or alternative statuses may also be used.

In some embodiments, a user may also define custom statuses and/or custom status messages. For example, a user may define a custom status message saying that she is "on vacation."

The messaging servers 106 may also store, for each user of the messaging service, an address book (or a buddy list, contact list, or the like). The address book is a roster of one or more contacts associated with the user. A contact is a person with whom the user has previously communicated (by email, voice, IM, and so on) or with whom the user may wish to choose to communicate. The address book associates contacts with one or more communication addresses or locators (email address, IM address, phone number, and so on) as well as other information such as a name or profile. A contact may or may not participate in the same IM network as the user and therefore may or may not be reachable over IM. Further information regarding the address book is described below, in relation to FIGS. 4A-4D.

In some embodiments, particular messaging servers may be assigned to monitor and store the status information and address books of a particular subset of users. An example of this configuration is illustrated in FIG. 1B. In FIG. 1B, the network 120 includes clients 122-A, 122-B, and 122-C, each associated with a different user. Each client may include one or more client applications 124. The network 120 also includes messaging servers 126-A, 126-B, and 126-C, and a network 128 that couples these components.

Each messaging server 126-A, 126-B, 126-C is assigned a subset of users. For example, messaging server 126-A is assigned the user of client 122-A, messaging server 126-B is assigned the user of client 122-B, and messaging server 126-C is assigned the user of client 122-C. Whenever a user goes from offline to an online status, the client application associated with that user sends a message informing its corresponding messaging server of its status change. The messaging server receives that message, updates the status of the user, and forwards the new status to other interested messaging servers.

Figure 1C:
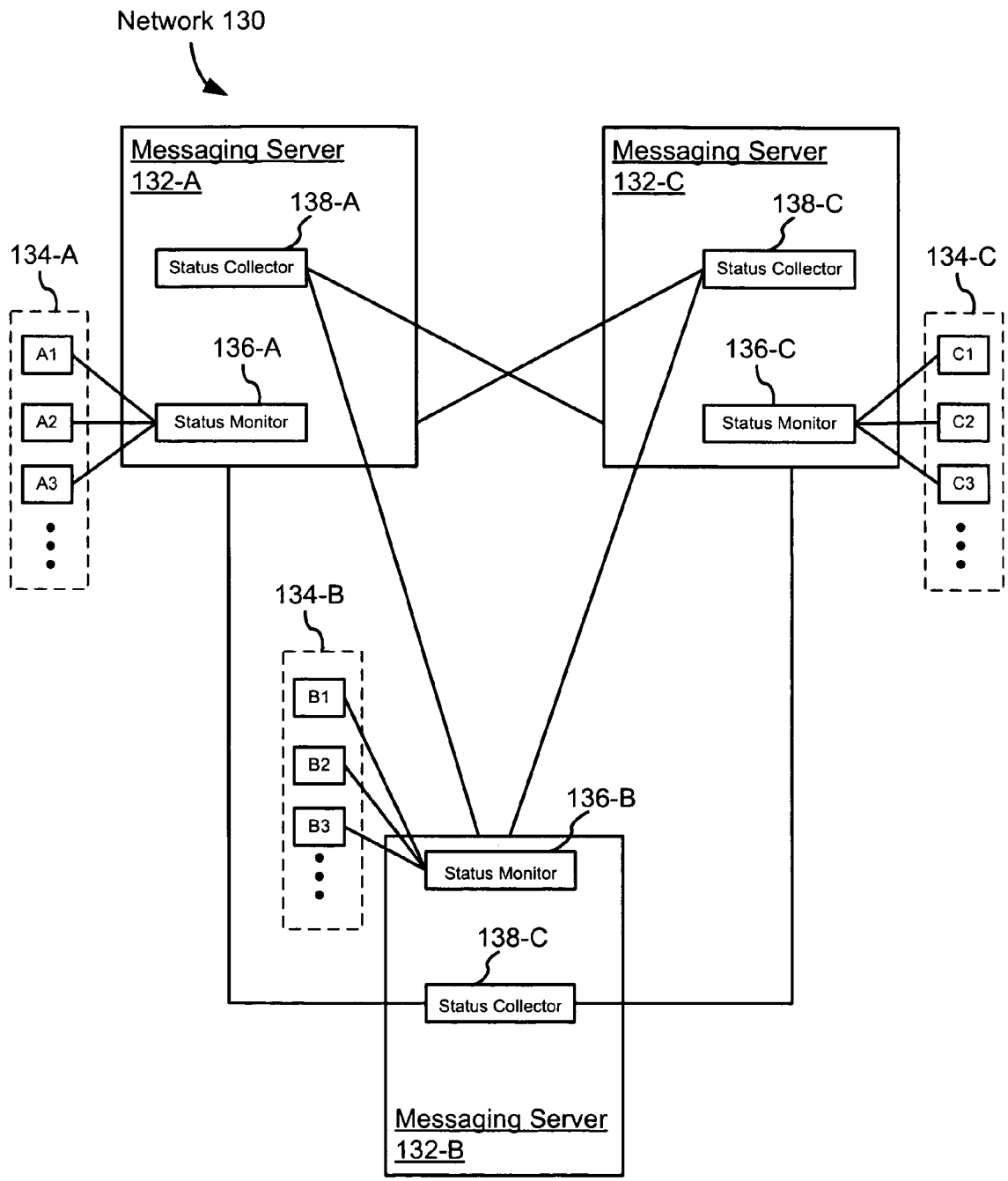
FIG. 1C is a block diagram illustrating a network of messaging servers, according to some embodiments of the invention.

FIG. 1C is a block diagram illustrating a network of messaging servers, according to some embodiments of the invention. FIG. 1C illustrates an embodiment of a logical coupling of the messaging servers to each other and to clients for monitoring and reporting the statuses of the users on the clients. The network 130 includes messaging servers 132-A, 132-B, and 132-C. The network 130 may include more or fewer messaging servers than what is shown in FIG. 1C. Each messaging server is assigned a set of one or more users. Messaging server 132-A is assigned users 134-A. Messaging server 132-B is assigned users 134-B. Messaging server 132-C is assigned users 134-C. Each messaging server includes a status monitor and a status collector. Thus, messaging server 132-A includes a status monitor 136-A and a status collector 138-A. Messaging server 132-B includes a status monitor 136-B and a status collector 138-B. Messaging server 132-C includes a status monitor 136-C and a status collector 138-C. In some other embodiments, each of the messaging servers has one status monitor and one status collector per user that is assigned to the respective messaging server.

Whenever user goes from offline to online (e.g., by logging in at the client application), the client application sends a message to the network 130 announcing that it is online. In some embodiments, this message is routed to the messaging server assigned to the user, and the other messaging servers will not receive this message directly because it came from a user not assigned to them. The status monitor at the messaging server to which the user is assigned receives the message and changes the status of that user to "online" (or "active," "busy," or whatever status is appropriate). Furthermore, the status collector at the messaging server gathers the statuses of the contacts in that user's address book. While some of the contacts in the user's address book may be assigned to the same message server, other contacts in the user's address book are assigned to other message servers. The status collector assigned to the user gathers the statuses of the user's contacts, including those assigned to other messaging servers, and forwards at least a portion of the collected status information to the user. In some embodiments, the status collector broadcasts requests for status information of the contacts to the network and the messaging servers to which the contacts are assigned respond to the requests. In some other embodiments, the status collector determines the messaging servers to which the contacts are assigned and sends requests for status information to those messaging servers. In some embodiments, the contact assignments may be determined by reference to an index of all users, a copy of which may be stored in all of the messaging servers or a subset thereof, and their messaging server assignments.

For example, if a user A1 of users 134-A, assigned to messaging server 132-A, goes from offline to online, the client application associated with the user A1 sends a message to the network 130 announcing that user A1 is online. The status monitor 136-A at the messaging server 132-A receives the message (the other messaging servers 132-B and 132-C will not receive it) and updates the status of the user A1 to online. The status collector 138-A at the messaging server 132-A obtains a list of the contacts in the user A1's address book, for instance by accessing user A1's address book. Using that list of contacts, the status collector 138-A gathers status information from the messaging servers to which the contacts are assigned. Thus, if a contact is assigned to messaging server 132-A, then the status collector 138-A accesses the contact's status information stored at messaging server 132-A. If the contact is assigned to messaging server 132-B, then it communicates with messaging server 132-B to get the status information. A similar procedure occurs if the contact is assigned to messaging server 132-C.

Figure 2:
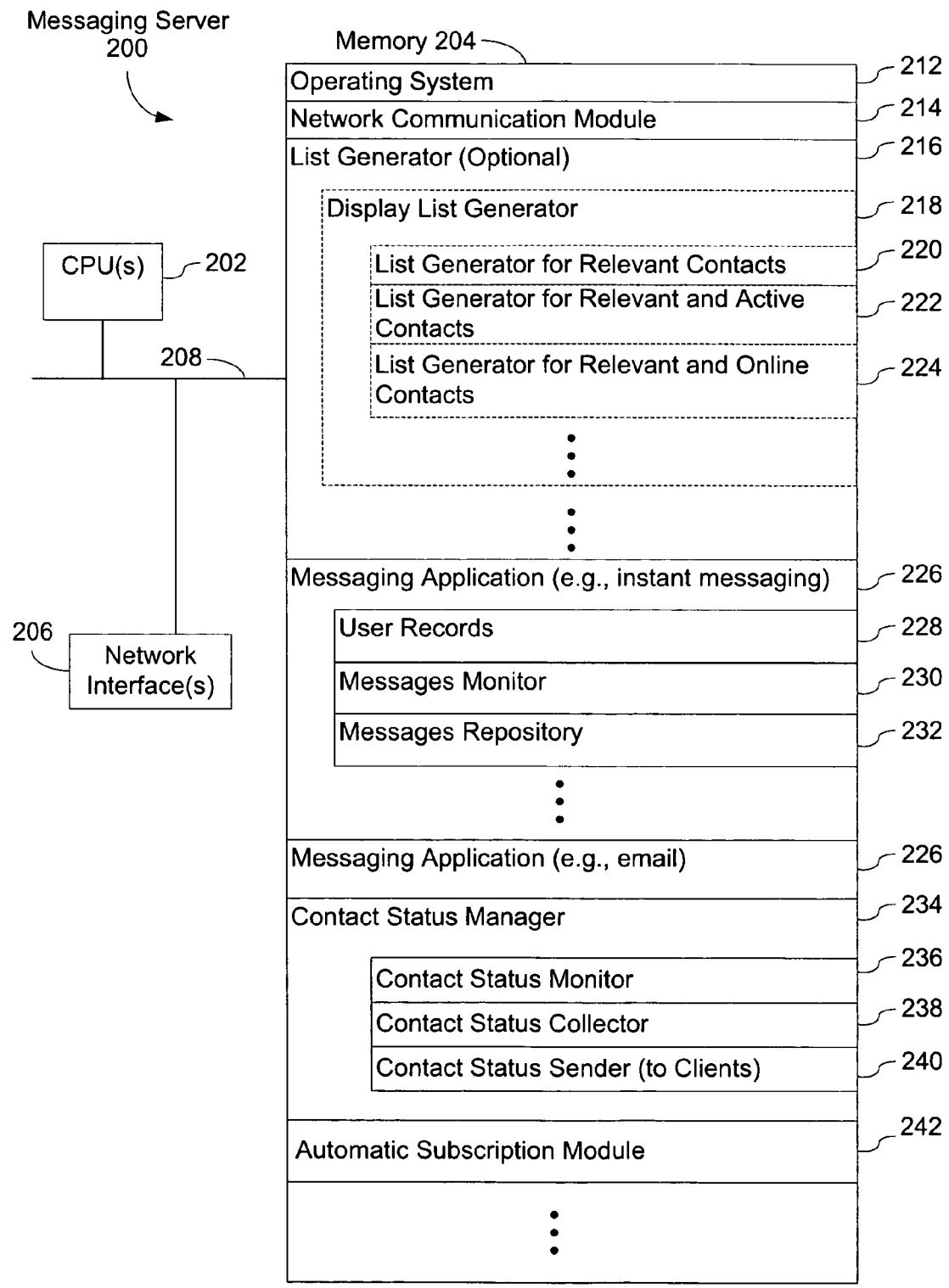
FIG. 2 is a block diagram illustrating a messaging server, according to some embodiments of the invention.

FIG. 2 is a block diagram illustrating a messaging server, according to some embodiments of the invention. The messaging server 200 typically includes one or more processing units (CPU's) 202, one or more network or other communications interfaces 206, memory 204, and one or more communication buses 208 for interconnecting these components. The messaging server 200 optionally may include a user interface (not shown), which may include a display device, a keyboard, and/or a mouse. Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 204 may optionally include one or more storage devices remotely located from the CPU(s) 202. Memory 204, or alternatively one or more storage devices (e.g., one or more nonvolatile storage devices) within memory 204, includes a computer readable storage medium. In some embodiments, the computer readable storage medium stores the following programs, modules and data structures, or a subset thereof:

- an operating system 212 that includes procedures for handling various basic system services and for performing hardware dependent tasks;
- a network communication module 214 that is used for connecting the messaging server 200 to other computers via the one or more communication network interfaces 206 (wired or wireless) to one or more communication networks, such as the Internet, other wide area networks, local area networks, metropolitan area networks, and so on;
- an optional list generator 216 for generating lists of contacts;
- one or more messaging applications 226, such as an instant messaging application or an email application;
- a contact status manager 234 for managing statuses of users; and
- an automatic presence subscription module 242 for automatic presence subscription.

The list generator may include a display list generator 218, which generates lists of contacts for presentation in the display region of a client application. The display list generator 218 includes a list generator for relevant contacts 220, a list generator for relevant and active contacts 222, and a list generator for relevant and online contacts 224. The list generator for relevant contacts 220 generates a list of contacts that are relevant, but not necessarily active or even online at all. "Relevant," as used herein, means that the user has had interaction with the contact. Interaction may include, but is not limited to, message exchanges, scheduled meetings, transfers and/or sharing of files (such as digital images), and explicitly adding a contact to the address book. As discussed in more detail below, the list of relevant contacts may be selected in accordance with a scoring function that associates a score with each contact based on the quantity, type and age of the interactions between the contact and the user. The score is sometimes herein called a contact interaction score. The list generator for relevant and active contacts 222 generates a list of contacts that are relevant and "active" (or relevant and "chatty"). The list generator for relevant and online contacts 224 generates a list of contacts that are relevant and not offline. In some embodiments, the list generator may also include list generator modules for generating lists of relevant contacts that are offline and generating lists of relevant contacts that have nonempty status messages. The lists are sent to a client application for display in the display region of the client application.

The messaging application 226 may include user records 228, a message monitor 230 for monitoring message traffic to and from the messaging server 200, and a messages repository 230 for storing messages sent and received by clients. The user records 228 include status information and address books of users. In some embodiments, a messaging application may include a calendar application, and interactions between a user and other contacts may include appointments or other calendar events that reference the user's contacts.

The contact status manager 234 includes a contact status monitor 236, a contact status collector 238, and a contact status sender 240. The contact status monitor 236 receives and processes messages announcing status changes and updates status of users. The contact status collector 238 gathers status information for contacts in a user's address book from other messaging servers. The contact status sender 240 sends the status information of contacts in a user's address book to the client associated with the user.

The automatic presence subscription module 242 implements the server-side portions of the automatic presence subscription and by invitation process flows 600, 650, as described with respect to FIGS. 6A-C, 7, 8A and 8B.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 204 may store a subset of the modules and data structures identified above. Furthermore, memory 204 may store additional modules and data structures not described above.

Although FIG. 2 shows a "messaging server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a messaging server and how features are allocated among them will vary from one implementation to another, and may depend in part on the amount of data traffic that the system must handle during peak usage periods as well as during average usage periods.

Client Architecture

Figure 3:
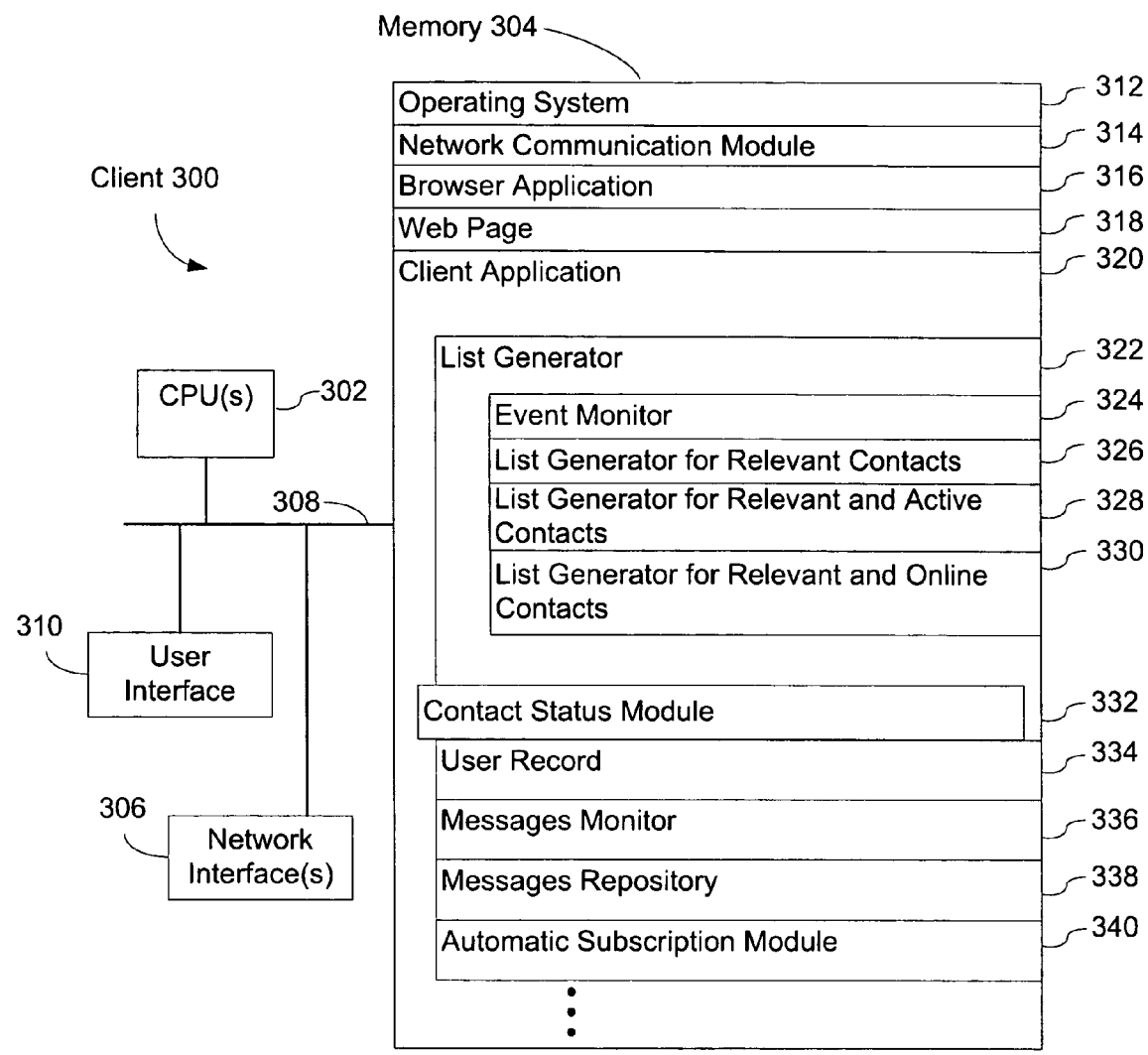
FIG. 3 is a block diagram illustrating a client, according to some embodiments of the invention.

FIG. 3 is a block diagram illustrating a client, according to some embodiments of the invention. The client 300 typically includes one or more processing units (CPU's) 302, one or more network or other communications interfaces 306, memory 304, and one or more communication buses 308 for interconnecting these components. The client 300 also includes a user interface 310, which may include a display device, a keyboard, and/or a mouse. Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU(s) 302. Memory 304, or alternatively one or more storage devices (e.g., one or more nonvolatile storage devices) within memory 304, includes a computer readable storage medium. In some embodiments, the computer readable storage medium stores the following programs, modules and data structures, or a subset thereof:
- an operating system 312 that includes procedures for handling various basic system services and for performing hardware dependent tasks;
- a network communication module 314 that is used for connecting the client 300 to other computers via the one or more communication network interfaces 306 (wired or wireless) to one or more communication networks, such as the Internet, other wide area networks, local area networks, metropolitan area networks, and so on;
- a browser application 316;
- a web page 318;
- a client application 320; and
- an automatic presence subscription module 340.

The client application 320 includes a list generator 322 for generating lists of contacts; a contact status module 332 for sending, receiving, and processing status information; a user record 334, a messages monitor 336, and optionally a messages repository 338. The user record 334 is a copy of part or all of the messaging server's user record 228 for the particular user of the client 300. The messages monitor 336 monitors the sending and receiving of messages by the client application 320. The messages repository 338 is a store of messages sent or received by the client application 320. In some embodiments, the messages repository 338 only stores a small number of messages, such as one or more messages currently being viewed or drafted by the user, while other messages are stored at a message server.

The list generator 322 may include an event monitor 324, which detects events that are defined to triggers a list refresh. The list generator 322 also may include a list generator for relevant contacts 326, a list generator for relevant and active contacts 328, and a list generator for relevant and online contacts 330. The list generator for relevant contacts 326 generates a list of contacts that are relevant (e.g., contacts deemed most relevant in accordance with a scoring function), but not necessarily active or even online at all. The list generator for relevant and active contacts 328 generates a list of contacts that are relevant and "active" (or relevant and "chatty"). The list generator for relevant and online contacts 330 generates a list of contacts that are relevant and not offline.

In some embodiments, the client application 320 is a standalone application. In some other embodiments, the client application 320 may be an application embedded in a web page that is rendered by another application, such as a browser application 316. The application that is rendered by the browser application 316 may be displayed in a web page 318. In these embodiments, the client application may be written in JavaScript™ (a trademark of Sun Microsystems, Inc.), ECMAScript (the specification for which is published by the European Computer Manufacturers Association International), VBScript™ (a trademark of Microsoft, Inc.) and/or any other client-side scripting language. In other words, the client application 320 includes programs or procedures containing JavaScript instructions, ECMAScript instructions, VBScript instructions, or instructions in another programming language suitable for rendering by the browser application.

The automatic presence subscription module 340 is used to implement the client-side portions of the automatic presence subscription and by invitation process flows 600, 650, as described with respect to FIGS. 6A-C, 7, 8A and 8B.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise rearranged in various embodiments. In some embodiments, memory 304 may store a subset of the modules and data structures identified above. Furthermore, memory 304 may store additional modules and data structures not described above.

Although FIG. 3 shows a "client," FIG. 3 is intended more as functional description of the various features which may be present in a client than as a structural schematic of the embodiments described herein. In practice, and as recognized by those of ordinary skill in the art, items shown separately could be combined and some items could be separated.

Messaging Server Architecture

Figure 4A:
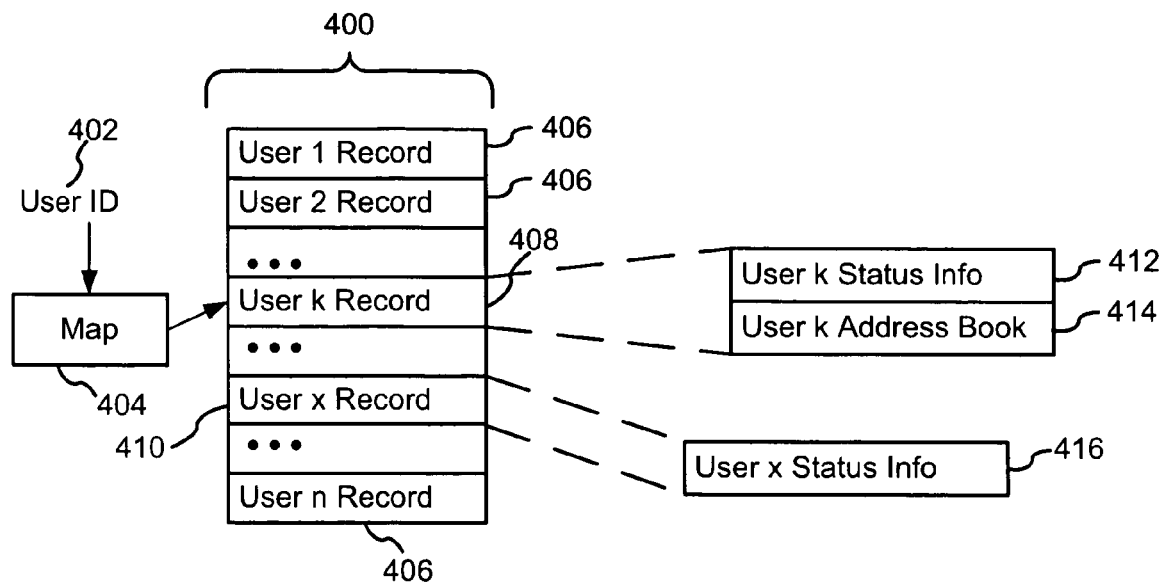
FIGS. 4A-4D illustrate data structures residing in a messaging server, according to some embodiments of the invention.

FIGS. 4A-4D illustrate data structures residing in a messaging server, according to some embodiments of the invention. The messaging server stores one or more user records in a data structure 400, as shown in FIG. 4A. Each user is associated with a unique user ID 402. In some embodiments, the user ID is a number. In some other embodiments, the user ID is a string of characters. The string of characters may represent, for example, a username, a username and a host/domain name, or an email address.

Each user ID is associated with a user record 406 by a map or index 404. The messaging server includes user records for users assigned to the messaging server, such as user record 408. The messaging server may also include user records, such as user record 410, for users not assigned to the messaging server but which are in the address books of users that are assigned to the messaging server. For the user record 408 of a user that is assigned to the messaging server, the messaging server stores that user's status information 412 and address book 414. For the user record 410 of a user who is not assigned to the messaging server, the messaging server stores that user's status information 416. That user's address book is stored at the messaging server to which that user is assigned.

Figure 4B:
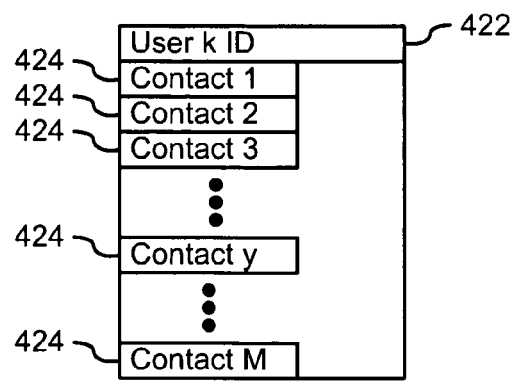

An exemplary address book 414 is illustrated in FIG. 4B. The address book includes a plurality of contact records 424. The address book may also include the user ID 422 of the user, to identify the user with which the address book is associated.

Figure 4C:
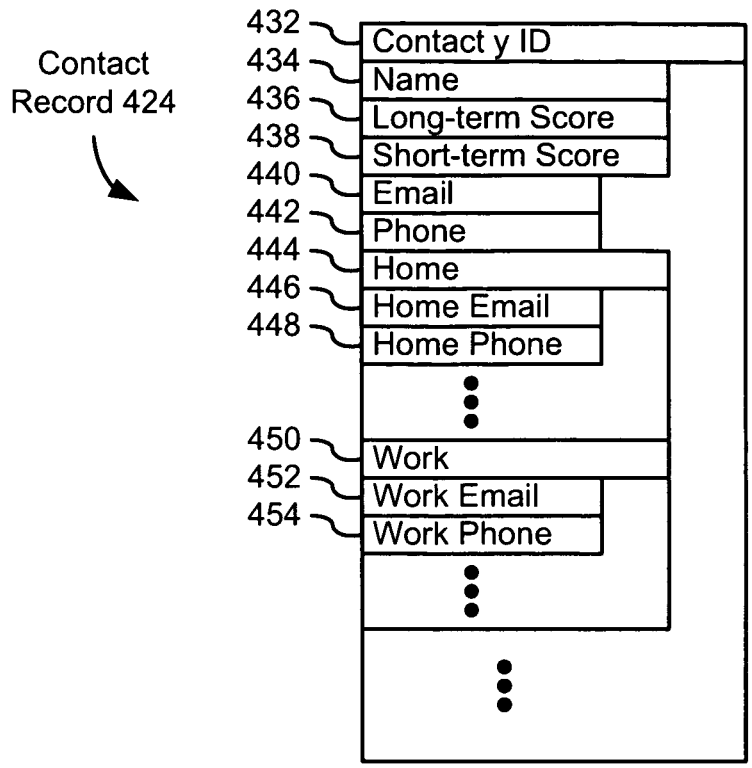

An exemplary contact record 424 is illustrated in FIG. 4C. The contact record 424 includes the user ID 432 of the contact, a name of the contact 434, a score 436 sometimes called the long term score, an optional short term score 438, an email address 440, and a phone number 442. The contact record may also have home contact information 444 and work contact information 450. The home contact information may include a home email address 446 and a home phone number 448. Similarly, the group for work contact information may include a work email address 452 and a work phone number 454. It should be appreciated, however, that additional or alternative information regarding the contact the contact may be included in the contact record.

The long term score 436 is used in the generation of contact lists for presentation. The long term score 436 may be determined based on many factors. The factors may include, but is not limited to, an interaction history (e.g., one or more of the following: message (email and/or IM) exchanges, file transfers or sharing, calendar events) between the user and the contact. In some embodiments, the factors may further include degrees of separation between contacts and/or profile matching. The long term score measures the degree of relevance of a contact to the user over a prolonged period of time, with a higher score indicating higher relevance. In some embodiments, the long term score is decayed by a predefined percentage (e.g., 10%) at predefined intervals, such as monthly or weekly.

In some embodiments, only one contact interaction score 436 is used for generating contact lists for presentation to the user. However, in some other embodiments, both the long term score 436 and the short term score 438 are used in the generation of contact lists for presentation. The short term score 438 is a score based on short-term message activity from the user to the contact. The short term score is, in some embodiments, a running tally of messages sent by the user to the contact. Thus, a message sent by the user to the contact results in an increment of 1 of the short term score. Some special messages may result in an increment of more than 1 to the short term score. In some embodiments, the running tally counts only IM messages and special messages. The short term score measures the degree of relevance of a contact to the user over a short period of time up to the present moment. In some embodiments, the short term score is decayed by a predefined percentage (e.g., 10%) each day. In other embodiments, the short term score 438 may be based a broader spectrum of interactions between the user and contact, including messages received and sent, and calendar events. In some embodiments, the short term score may be based on messages to the contact; or interactions between the user and contact, in a predefined time window, such as a week; or a predefined number (e.g., a number between 2 and 15) of days; or may be based on the time of the last interaction with the contact rather than an accumulated score over time.

Figure 4D:
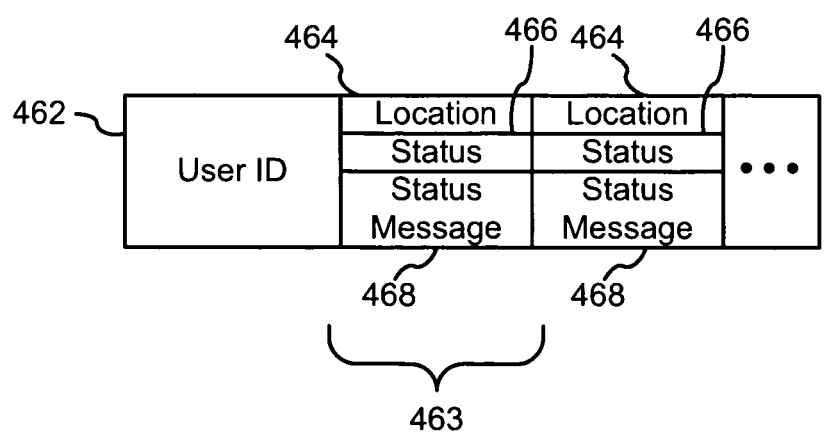

FIG. 4D illustrates a data structure for a user's status information 412, 416. The data structure includes the user's ID 462 and one or more status data 463. Each status data 463 includes location information 464, the user status at that location 466, and a status message 468. The status data 463 provides information on the status of the user at a particular device or location, represented by the location information 464. The status 466 indicates the user's status at the corresponding location, such as offline, active, idle, the time user was last online and so forth. The status 466 may be any of the predefined statuses or custom statuses defined by the user. The status message 468 is a string of characters that may be predefined or defined by the user to elaborate further on the user's status. The status message 468 is optional, and thus may be an empty string if it is not predefined or defined by the user.

Client Data Structures

Figure 5A:
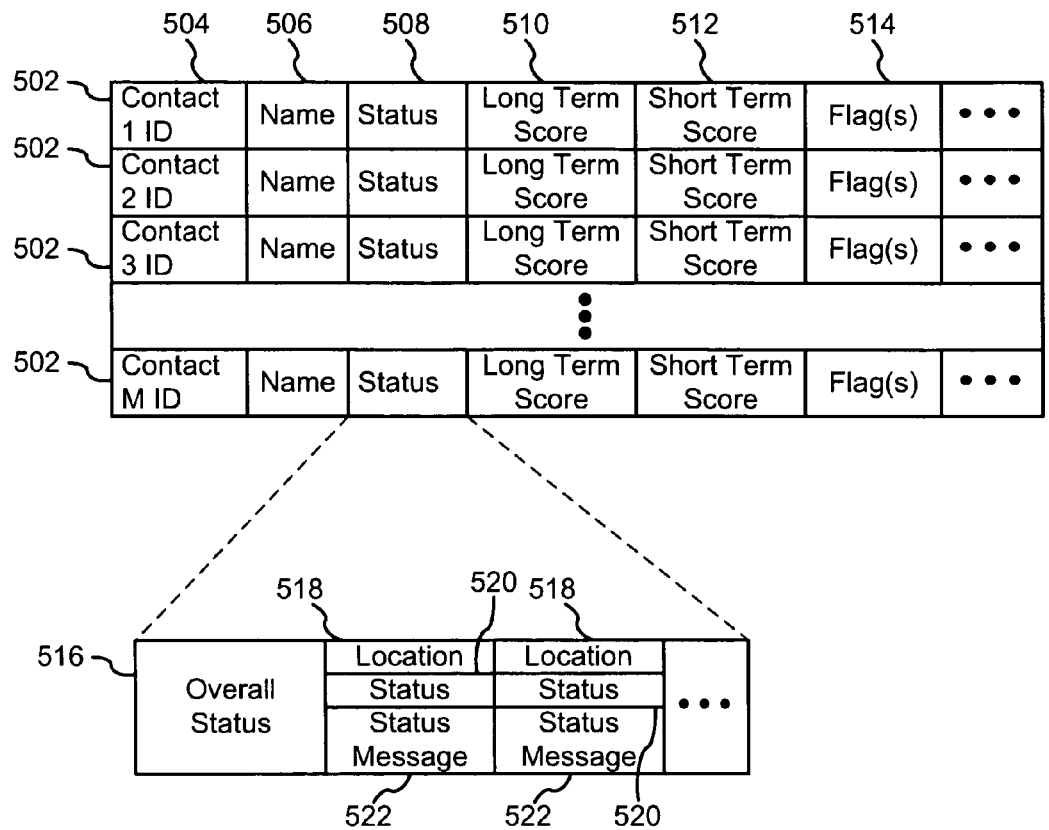
FIGS. 5A-5B illustrate data structures residing in a client, according to some embodiments of the invention.
Figure 5B:
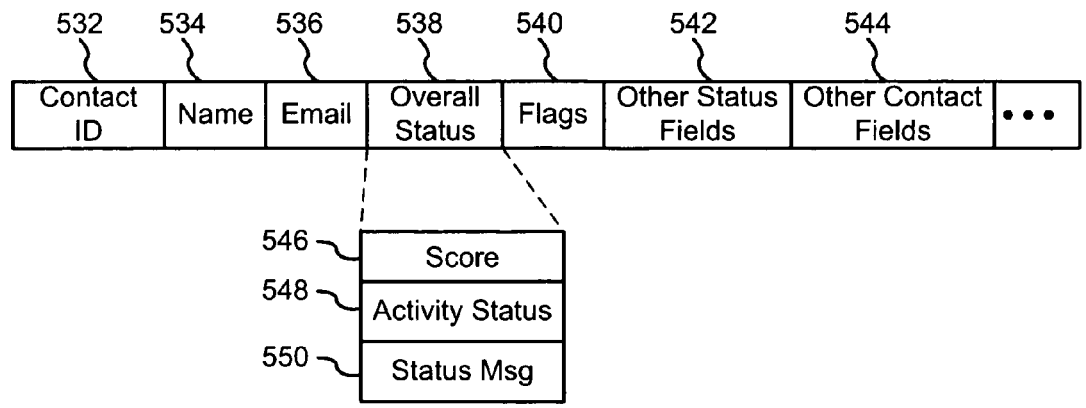

FIGS. 5A-5B illustrate data structures residing in a client, according to some embodiments of the invention. The client may store one or more contact records 502. The contact records that are stored correspond to the contacts in the address book (at the messaging server) of the user of the client. In other words, whatever contacts are in the user's address book at the messaging server, data for those contacts may also be stored at the client as well. In some embodiments, the client replicates the contact information (e.g., contact records) stored for the user at a messaging server. In some other embodiments, the client replicates a subset of the contact information stored for the user at a messaging server.

In FIG. 5A, a contact record 502 includes the user ID of the contact 504, a name of the contact 506, status information 508, a long term score 510, a short term score 512, and one or more flags 514. The user ID 504, name 506, status information 508, long term score 510, and short term score 512 are replicated from the messaging servers. The contact record data in the messaging servers is the authoritative version and may be used to overwrite any conflicting data at the client. In some embodiments, the client may track some data, such as the short term score 512, quasi-independently. That is, the messaging server and the client may calculate the short term score independently, but the client still replicates the score from the server at predefined intervals or upon particular events, such as the user coming online or when the score is decayed.

The one or more flags 514 indicate one or more states associated with the contact. In some embodiments, the flags 514 may include one or more of the following: a flag indicating whether an outgoing request for the contact's status information is pending, a flag indicating whether an incoming request from the contact for the user's status information is pending, a flag indicating whether the contact is designated as special or important by the user, a flag indicating whether the user has previously refused (or blocked) the contact from receiving status information associated with the user, a flag indicating whether the user has blocked this contact from any real-time communications with the user, and a flag indicating whether the user has removed this contact from his quick list (further details regarding quick lists are described below, in relation to FIGS. 6-10).

The status information 508 is status information for the corresponding contact. The status information 508 includes one or more locations 518 and corresponding statuses 520 and status messages 522. These locations and corresponding statuses and status messages are replicated from the location information 464, statuses 466, and status messages 468 that are stored at the message server(s). From these, an overall status 516 is determined and stored in the data structure. In some embodiments, the overall status 516 is the most recent status 520 of the user at any location and the status message 522 from the same location. In other embodiments, each location may give itself a priority number, and the overall status is chosen from the location with the highest priority. When the user has only one location, the overall status 516 is simply a copy of the user status at that one location.

FIG. 5B illustrates an alternative embodiment of a contact record 502 stored at the client. The contact record includes the user ID of the contact 532, a name of the contact 534, an email address 536 of the contact, an overall status 538, one or more flags 540, other status fields 542, and other contact fields 544. The user ID, name, email address and overall status are automatically replicated from the message servers for all contacts in the user's address book. Other fields, such as the other status fields 542 and other contact fields, are replicated at the client for specific contacts when those fields are needed (e.g., the other contact fields 544 are needed when the user requests to open a contact record in the user's address book).

The overall status 538 includes a score 546, an activity status 548, and a status message 550. The score, used in the generation of contact lists for presentation, may be either the long term score 436 associated with the contact, the short term score 438 associated with the contact, or a mathematical combination (e.g., a weighted sum) of both. The activity status 548 and status message 550 are derived from the status information illustrated in FIG. 4D.

Automatic Presence Subscription Process Flow

Figure 6A:
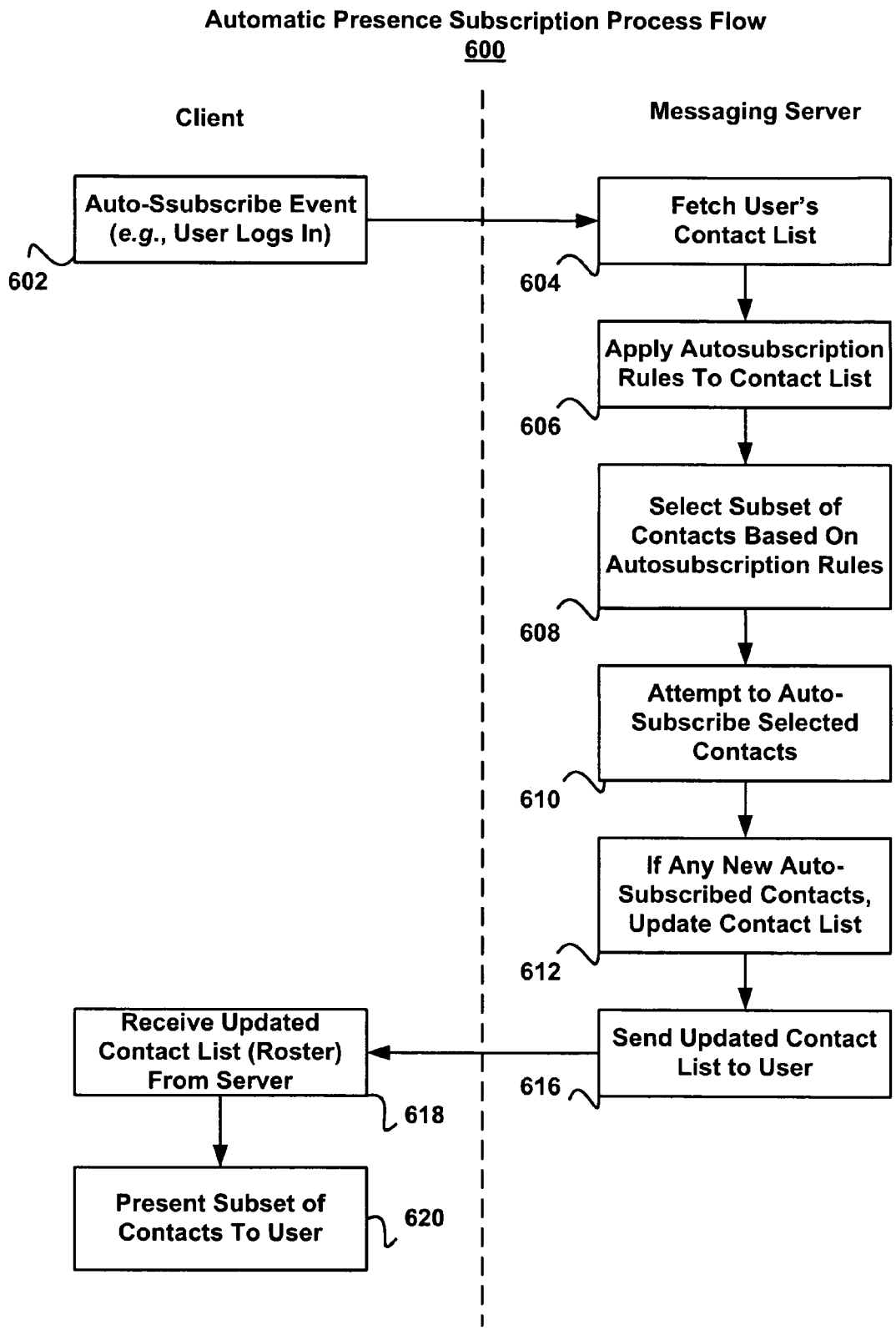
FIG. 6A is a flow diagram of an automatic presence subscription process, according to some embodiments of the invention.

FIG. 6A is a flow diagram of an automatic presence subscription process 600, according to some embodiments of the invention. While the process 600 includes a number of operations that appear to occur in a specific order, it should be apparent that these processes can include more or fewer operations, some of which can be executed serially or in parallel (e.g., using parallel processors or a multi-threading environment). The process 600 enables users who communicate frequently with each other to be automatically subscribed to each others contact lists in a safe and unobtrusive manner.

The process 600 begins in response to an auto-subscribe event at the client. The auto-subscribe event can be an initialization event triggered by certain acts performed by a user, such as logging into a network-based messaging server or starting a messaging services application (e.g., an IM application). In other embodiments, the initialization event can occur when the client device is first powered-up. Alternatively, the process 600 can be triggered when a new contact is added or if the automatic subscription rules (described below) for an unsubscribed contact are satisfied, such as when email communication activity between the user of the client and a contact reaches a trigger threshold for initiating automatic presence subscription.

In response to an auto-subscribe event (602), a messaging server fetches (step 604) the user's contact list (or an address book, buddy list, roster or the like) and applies one or more auto-subscription rules to the contact list (606). In some embodiments, the rules are applied to some or all of the user's existing email contacts. A subset of contacts is selected based on the rules (608). These rules can include excluding contacts that have previously rejected a presence subscription invitation and/or excluding contacts for which the user has previously rejected a presence subscription invitation. The messaging server then attempts to auto-subscribe the selected contacts (610). In some embodiments, this includes determining whether the automatic subscription feature is enabled for both the user and the contact, and determining whether a set of automatic subscription rules are satisfied for both the user and the contact (i.e., bilateral presence subscription). When the automatic subscription rules are satisfied for both the user and the contact, and automatic subscription is enabled for both users, the contact lists of both the user and the contact are updated to reflect the new bilateral presence subscription (612). For instance, referring to FIG. 7, the Contact Type of the contact may be set to New (e.g., by setting the contact's New flag 714 and clearing any other Contact Type flags), and the subscription state of the contact may be set to Both 728.

If there are any new auto-subscribed contacts (612), an updated contact list (roster) is sent to the client (616). The client receives the updated contact list (roster) from the messaging server (618) and presents the updated contact list to the user (620). In some embodiments, the contacts are displayed in a manner that alerts the user that an automatic subscription has been completed, as described with respect to FIGS. 8A and 8B. Furthermore, the contact list presented to the user includes online status information for each of the contacts for whom the user has a presence subscription. In some embodiments, the displayed online status information may include online status values such as "active," "idle," "busy," "chatty," and offline. The displayed online status information may also include user-customized online status values or user defined status messages, such as "I'm on vacation" and the like.

Figure 6B:
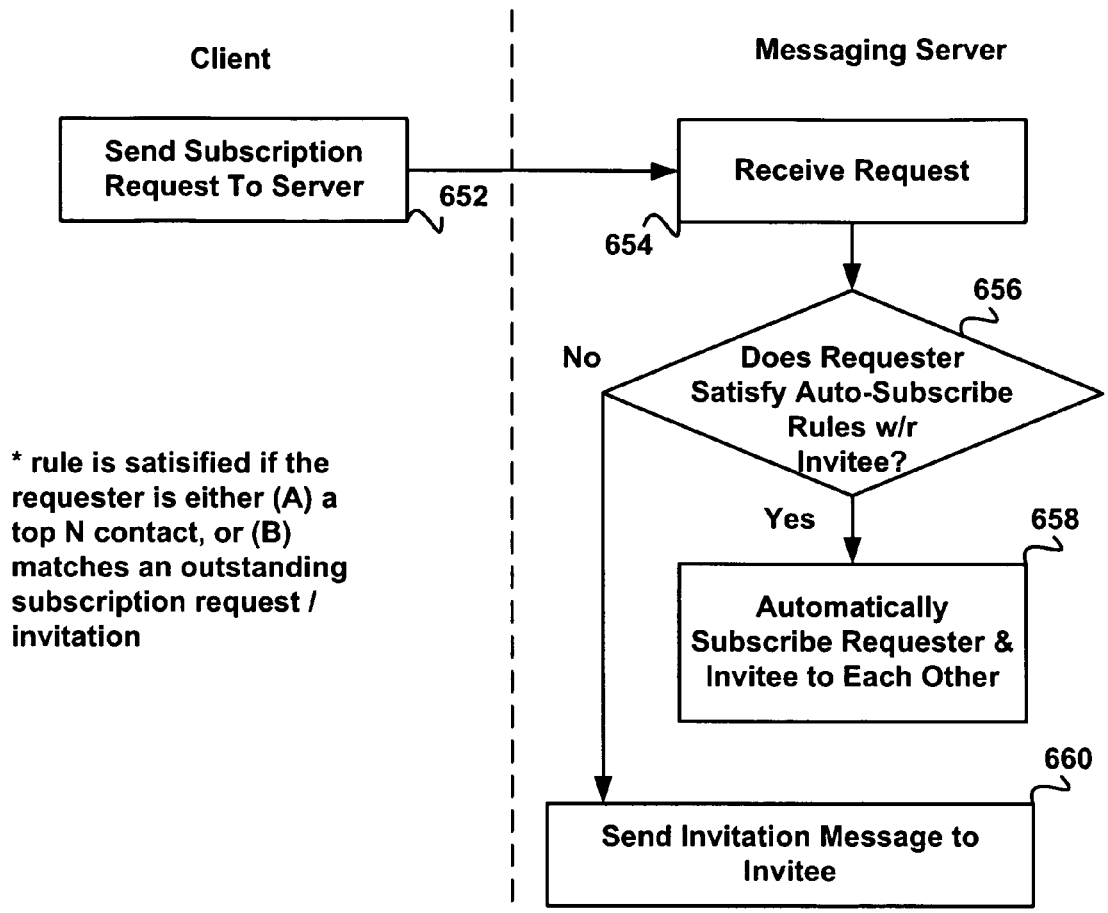
FIGS. 6B and 6C are flow diagrams of a "by invitation" presence subscription process, according to some embodiments of the invention.
Figure 6C:
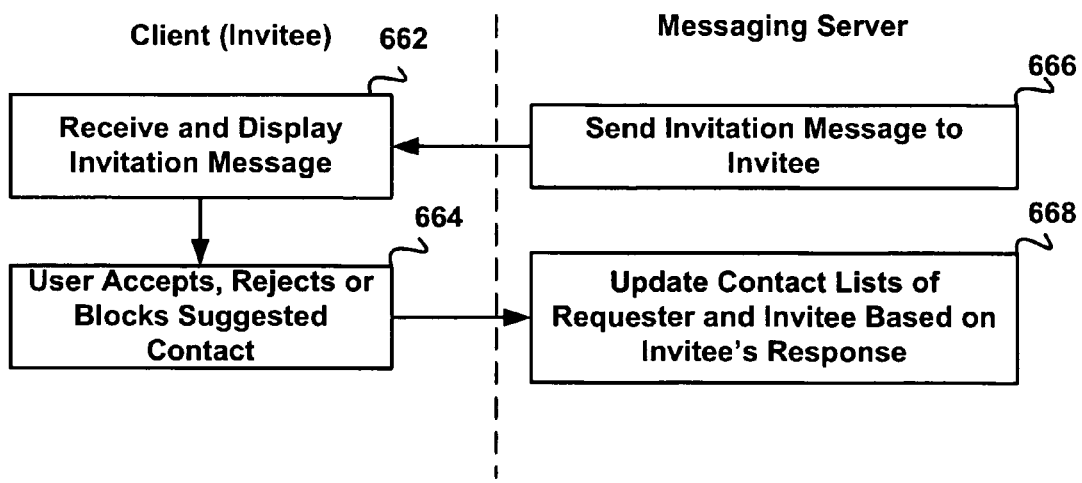

FIGS. 6B and 6C are flow diagrams of a "by invitation" presence subscription process 650, according to some embodiments of the invention. While the process 650 includes a number of operations that appear to occur in a specific order, it should be apparent that these processes can include more or fewer operations, some of which can be executed serially or in parallel (e.g., using parallel processors or a multi-threading environment).

The process 650 begins when a subscription request is sent by the client to the messaging server (652). In some embodiments, the subscription request identifies a contact (sometimes herein called the invitee) with whom the user (sometimes herein called the requester) would like to exchange IM messages. The messaging server receives the request (654) and determines if the requestor satisfies the automatic subscription rules with respect to the contact/invitee (e.g., as determined by applying the automatic subscription rules to the invitee's contact list) (656). If the rules are satisfied then the messaging server automatically subscribes the requester and the invitee to each other (660). In some embodiments, the automatic subscription rules are satisfied if the requestor is either a top N contact, or matches a pending subscription request/invitation sent by the contact.

In some circumstances the contact (in this case, the requester) will send an invitation message (e.g., an email) to the invitee (666). The client (invitee) receives and displays the invitation message (662) and the user can either accept or reject the invitation or block the contact from sending further invitations (664). The contact lists of the requester and invitee are then updated based on the invitee's response (668).

Subscription Rules

Some examples of subscription rules are listed below. The rules have been numbered for convenience and do not indicate a hierarchy of importance or a preferred order for applying the rules to contacts. It should be apparent that there can be more or fewer rules and that the rules can be applied to one or more contact lists in any order on one or more clients and/or messenger servers.

- Rule 1: A contact will not be automatically subscribed unless they are on the user's contact list and have a communication activity score larger than some threshold value greater than zero. The communication activity score is a measure of the quantity and/or frequency of communications exchanged between a user and a contact (e.g., email exchanges). For example, the score might be equal to the total number of communications sent by the user to the contact within a specified time frame. In some embodiments, the score might is a time weighted sum of the number of communications sent by the user to the contact, such as the number of communications sent during the current week, plus ninety percent of the communications sent during the prior week, plus eight-one percent of the communications sent two weeks ago, and so on. The communication activity score can be computed by incrementing the score each time an email message is sent to the contact, and by periodically (e.g., once per week, or once every N days) multiplying the score by a reduction factor (e.g., a number between 0.5 and 0.9). In some embodiments, the score is the long-term score 436 described with respect to FIGS. 4C and 7. In some embodiments, attributes associated with the contact can be used to determine a score alone or in combination with the quantity and/or frequency of communications. For example, if a contact is a member of a user-defined class, i.e., "family members" then the contact may be weighted more heavily than other contacts when computing an activity score. Thus, in this example the user's family members may be automatically subscribed even if the volume or frequency of communications is smaller than would be necessary for other contacts to be automatically subscribed. In some embodiments, the threshold can be adjusted by the user via a preference pane or similar software input mechanism (e.g., a scroll bar). For example, a user can set a threshold of three which means that if the user has sent three or more communication to a contact over a specified period of time (e.g., in the last week) the contact will be automatically subscribed. Rule 1 therefore prevents total strangers, or known contacts that have never exchanged communications with the user in the past, or known contacts from which the user has only exchanged a few communications, from being automatically subscribed. This rule can be applied to the contact list in the messaging server as a Boolean OR operation, i.e., if either the User A OR the Contact B have scores less than the threshold, the will not be automatically subscribed to each other.
- Rule 2: The top N contacts (e.g., 20) or the top N % of contacts (e.g., a percentage between 5% and 25%) based on a communication activity score are automatically subscribed. The messaging server tracks the communication activity (e.g., frequency of email exchanges) between a user and their contacts. The number N can be adjusted manually by the user through a preference or other input mechanism (e.g., a scroll bar). This rule allows only those contacts with whom the user communicates with on a regular basis to be automatically subscribed. This rule can be applied in the messaging server as a Boolean OR operation, i.e., the Contact B will be automatically subscribed as long as either the User A OR the Client B have the other designated as a top N contact, AND any other applicable Rules (e.g., Rules 1, 3 and 4) are also satisfied.
- Rule 3: Contacts whom the user explicitly removed or blocked will not be automatically subscribed, even if the other Rules are satisfied. Also, any contact that had previously requested to be subscribed but was rejected will not be automatically subscribed.
- Rule 4: If the user has turned off the automatic subscription feature, then no contacts will be automatically subscribed until the feature is turned on. This rule can be set in a settings dialog or preference pane on the client and used by the messaging server to enable or disable the automatic subscription feature.
- Rule 5: When "manual invite" subscription request is received, if the contact making the request would have complied with rules 1-4, i.e., the weight thresholds and other rules apply, then the contact will be automatically subscribed. This scenario is probably rare, but can happen if email activity is lopsided, and the person who has sent fewer messages manually asks to be the friend of the person who has sent more messages.
- Rule 6: A contact will be subscribed only if both the user and the contact can be transitioned to the same subscription state (described below) at the same time. If both the user and contact cannot be transitioned to the same subscription state at the same time then the user and the contact will not be automatically subscribed to each other.
- Rule 7: The user and contact will be automatically subscribed to each other only if the user and the contact are online at the same time. If the user and the contact are not online at the same time, then the user and the contact will not be automatically subscribed to each other.

In some embodiments, the automatic subscription process described above continues to monitor communication activity between the user and unsubscribed contacts. For example, if the user gets a new pen pal on email, then the user and contact can be automatically subscribed to each other after a sufficient amount of communication activity has occurred between them (e.g., the number and/or frequency of emails exceeds a threshold). Once a user and contact are automatically subscribed to each other, a flag or other status indicator can be set in the messaging server and/or the client to note that fact for future operations, as described with respect to FIG. 7.

Contact Types

Figure 7:
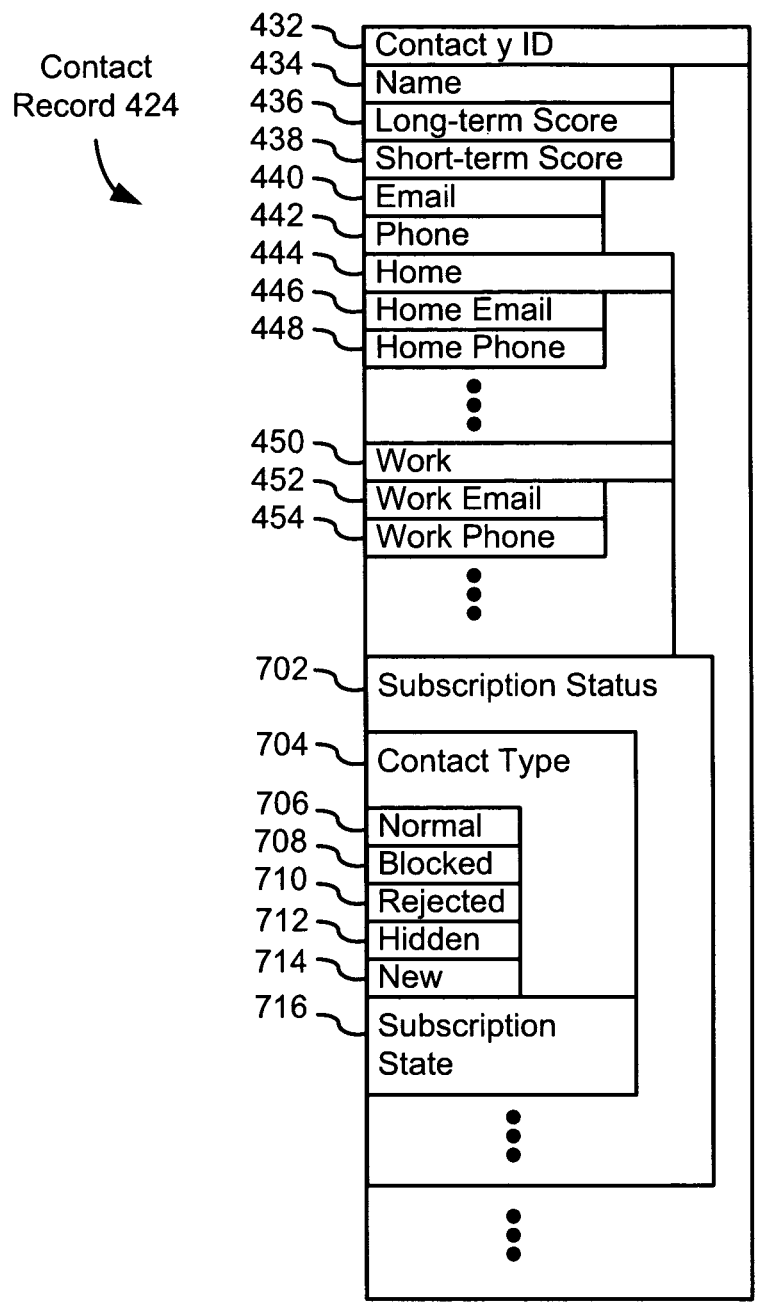
FIG. 7 is a block diagram illustrating a data structure for use with an automatic presence subscription process, according to some embodiments of the invention.

FIG. 7 is a block diagram illustrating a data structure for use with the automatic subscription and by invitation process flows 600, 650, described with respect to FIGS. 6A-C, according to some embodiments of the invention. An exemplary contact record 424 includes fields 432-454 which have been previously described with respect to FIG. 4C. In addition to those fields, the contact record 424 includes a subscription status data structure 702 which includes various fields for storing flags and other data used in the process flows 600 and

650. It should be apparent that the data structure 702 can be a separate data structure than the contact record 424, and can reside on one or more clients and/or one or more messaging servers depending upon the network architecture and/or messaging application.

The following several paragraphs describe in detail a few embodiments of a subscription status data structure (702, FIG. 2), a set of subscription states for contacts, and rules for transitioning between subscription states. It should be noted, however, that other embodiments of the present invention can be implemented using other subscription status data structures, and/or a different set of subscription states, and/or different rules for transitioning between subscription states. For instance, other embodiments may use fewer or more subscription states for contacts, which may require the use of a different subscription status data structure and different rules for transitioning between subscription states.

In some embodiments, the subscription status 702 includes a contact type field 704 for each contact. The contact type field 704 includes data that indicates whether a contact is Normal 706, Blocked 708, Rejected 710, Hidden 712 or New 714. In some embodiments, the contact type field 708 is maintained by the messaging server. A contact that is Normal 710 can receive a user's presence and status and can send and receive messages to and from the user if a bilateral presence subscription has been established between the user and the contact (i.e., the subscription state 716 for the contact is "both"). A contact that is Blocked 712 will not receive the user's presence and any traffic between the user and the contact is not transmitted, including subscription management traffic. A contact that is Rejected 710 will not be automatically subscribed. A contact that is Hidden 712 functions as a Normal contact, except that the contact is not shown in the user's contact list, and the automatic subscription feature is disabled for the contact. A contact that is New 714 is a contact for whom a presence subscription was recently established, and is otherwise the same as a contact that is Normal. Designating a contact's type as New 714 can be used to boost an activity score of the contact, so that the contact can be presented to the user in a manner that will attract the user's attention, such as placing the contact at the top of the contact list and/or providing indicia to indicate that a new contact has been automatically subscribed.

Subscription States

In some embodiments, presence subscriptions are managed using known messaging protocols, such as Extensible Messaging and Presence Protocol (XMPP) or Session Initiation Protocol for Instant Messaging and Presence Leveraging Extensions (SIMPLE), each specification of which is incorporated by reference herein in its entirety. The XMPP specifications (e.g., RFC 3921) define nine presence subscription states which can be expressed on an XMPP "roster." At any one time, each contact in the roster is in one of these nine states. From the user's perspective (not the contact's perspective) the nine subscription states defined by the XMPP specifications are as follows:

1. "None"=contact and user are not subscribed to each other, and neither has requested a subscription from the other;
2. "None+Pending Out"=contact and user are not subscribed to each other, and user has sent contact a subscription request but contact has not replied yet;
3. "None+Pending In"=contact and user are not subscribed to each other, and contact has sent user a subscription request but user has not replied yet;
4. "None+Pending Out/In"=contact and user are not subscribed to each other, contact has sent user a subscription request but user has not replied yet, and user has sent contact a subscription request but contact has not replied yet;
5. "To"=user is subscribed to contact (one-way);
6. "To+Pending In"=user is subscribed to contact, and contact has sent user a subscription request but user has not replied yet;
7. "From"=contact is subscribed to user (one-way);
8. "From +Pending Out"=contact is subscribed to user, and user has sent contact a subscription request but contact has not replied yet; and
9. "Both"=user and contact are subscribed to each other (two-way).

In some embodiments, information representing the presence subscription state of a user' contact is stored in the subscription state field 716 of the subscription status data structure 702 shown in FIG. 7. Furthermore, in some embodiments, only four of the nine subscription states (None, Pending In, Pending out, and Both) are stable states that can persist for more than a brief instant in time. The four stable subscription states are defined as follows. A subscription state of "None" means the contact and user are not subscribed to each other, and neither has requested a subscription from the other. A subscription state of "Pending Out" means the user has sent a subscription request to a contact and the contact has not replied yet. A subscription state of "Pending In" means a contact has sent the user a subscription request and the user has not replied yet. A subscription state of "Both" means that the user and a contact are subscribed to each other (two-way). It should be apparent that the automatic subscription feature will place the user and the contact into the "Both" subscription state based on one or more automatic subscription rules, as described with respect to FIG. 6A.

In some embodiments, in addition to the four stable subscription states mentioned above, there are two additional stable subscription states (To, and From). A subscription state of "To" means the user is subscribed to a contact (one-way). A subscription state of "From" means a contact is subscribed to a user (one-way).

In some embodiments, the subscription state 716 of a contact is represented by two values: a "subscription to state," which can have a value of None, Pending (i.e., Pending Out) or Subscribed (i.e., To); and a "subscription from state," which can have a value of None, Pending (i.e., Pending In) or Subscribed (i.e., From). The combination of these two state values represents the subscription state 716. While this combination of values can theoretically have nine distinct values, as listed above, in some embodiments only four of these states (listed above) are stable, while in some other embodiments six of these states (listed above) are stable. By knowing the current subscription state 716 of a contact, the client can generate an appropriate user interface to notify the user of pending subscriptions and to provide input mechanisms and/or dialogue for generating and accepting presence subscription requests.

Automatic Subscription State Transition

Depending on the respective subscription states a user and a contact reside in, it may be desirable to automatically move or transition the user and/or contact from one state to another state. For example, in states 1 and 7 the user cannot see the presence of the contact. State 7 (From) is unfair since the contact can see the user but the user cannot see the contact. In some embodiments, the messaging server will automatically move or transition the subscription states of the user and the contact from state 7 to state 1, so that the contact will no longer see the presence of the user. Similarly, because state 5 (To) is unfair, the messaging server will automatically move or transition the subscription states of the user and the contact from state 5 to state 1, so that the user will no longer see the presence of the contact. In states 2 and 8, the user has a pending subscription request with a contact. If the contact accepts the request, the subscription states of the user and contact will be automatically moved to state 9 (Both). In states 4 and 6, a contact has a pending subscription request with the user. If the user accepts the request, then the subscription states of the user and the contact will be automatically moved to state 9 (Both). Generally, whenever an automatic subscription occurs (i.e., one or more automatic subscription rules are satisfied), then the current respective states of the user and the contact will be moved to state 9, thus enabling the user and contact to have a two-way subscription, which includes the ability to exchange messages, presence and status.

In some embodiments, states 4 (Pending In +Pending Out), 6 (To+Pending In) and 8 (From +Pending Out) are automatically transitioned to state 9 (Both) because states 4, 6 and 8 are all indicative of mutual consent, by both the user and contact, to a bilateral presence subscription. More generally, in some embodiments, the messaging servers use two rules to determine implicit mutual consent to a bilateral presence subscription: (1) if a user has asked to see a contact's presence, then the user has implicitly granted permission for the contact to see the user's presence and (2) if a user accepts a subscription request from a contact, that is treated by the messaging server as an implicit request for a subscription to the contact's presence information, and therefore the messaging server sends a subscription from the user to the new contact.

It should be apparent that a variety of different state machines can be used to transition among the nine presence subscription states described above and that various combinations of states and state transitions can be achieved depending on the application and the desired outcome.

Example Display Region

Figure 8A:
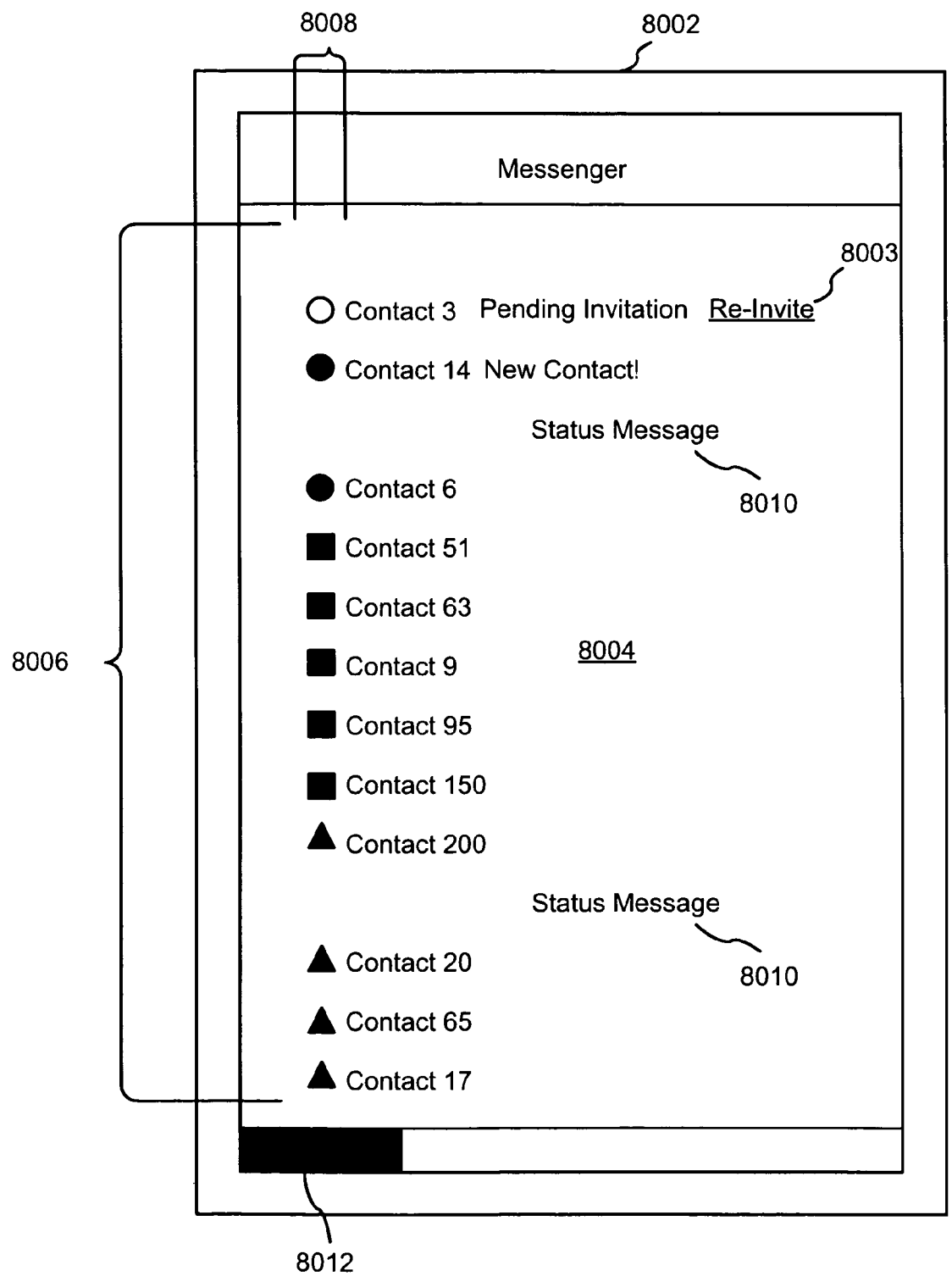
FIGS. 8A and 8B illustrate display regions of a client application for use with an automatic presence subscription process, according to some embodiments of the invention.
Figure 8B:
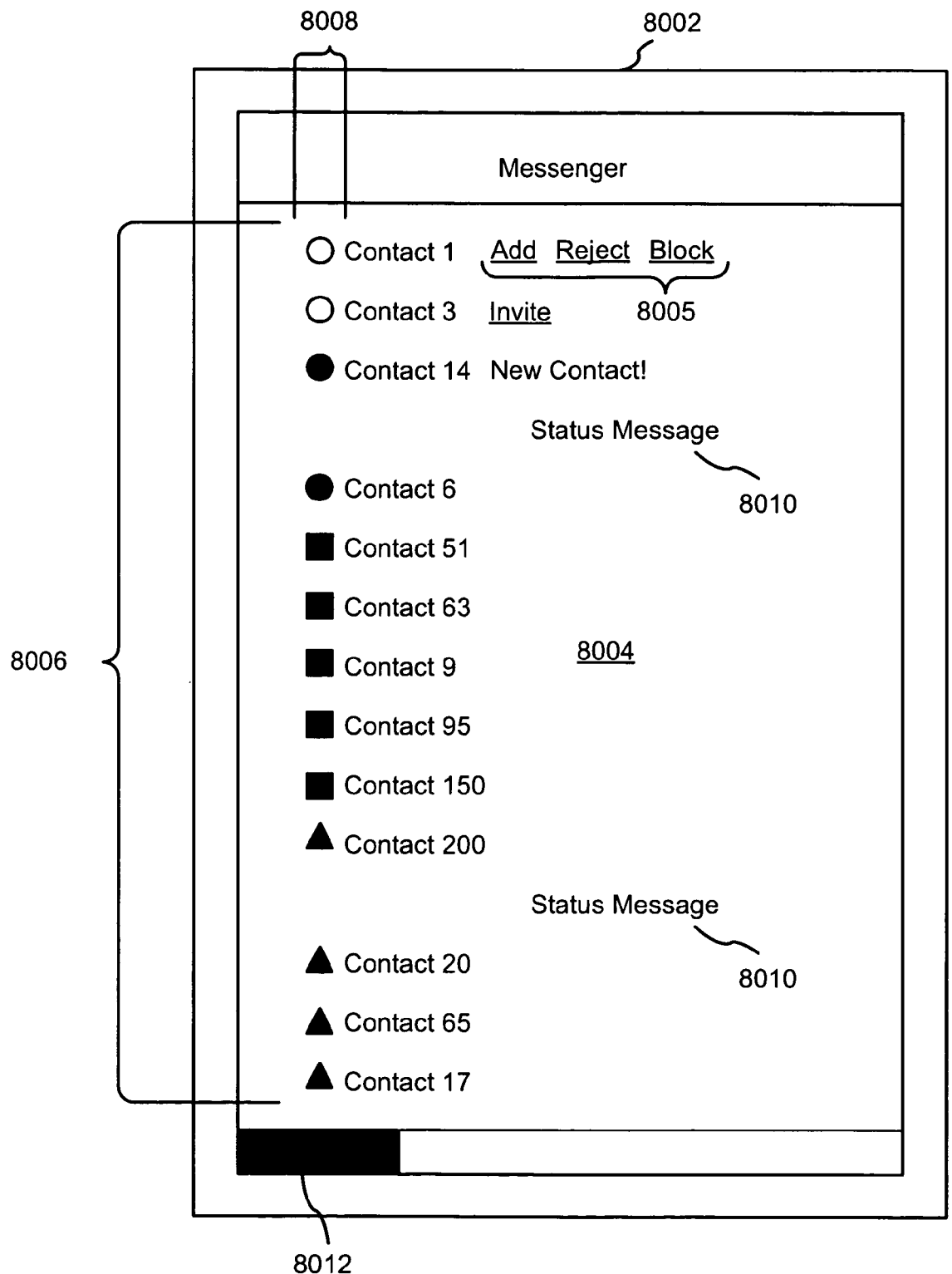

FIGS. 8A and 8B illustrate display regions of a client application, according to some embodiments of the invention. A client application window 8002 includes a display region 8004. The client application window 8002 includes a horizontal scrollbar 8012. In some embodiments, the client application window 8002 may have no vertical or horizontal scrollbar. Within the display region 8004 are displayed a list of contacts 8006. In some embodiments, the contacts in the list are selected from the user's address book based on predefined criteria, such as relevance, status, and connectedness. In other embodiments, the contacts are also selected via the automatic subscription process flows 600, 650. Within the display region is a column of icons 8008. The column 8008 includes icons adjacent to each contact displayed in the display region 8004, indicating the current status of the respective contact. For some contacts, a status message 8010 may be displayed in the display region as well.

As described with respect to FIGS. 6A and 7, when the automatic subscription feature 8003 is enabled the messaging server will automatically generate a list of contacts from, for example, the user's email contacts. If the user and a given contact (e.g., contact 14 in FIG. 8A) comply with each other's automatic subscription rules, then the contact and user will be listed in each others contact lists. In some embodiments, a text message or other indicia is presented in the display region 8004 to direct the user's attention to the newly subscribed contact. For example, the contact 14 is presented in the region 8004 as a result of an automatic subscription process 600. The user can see the status 8010 of contact 14 and send/receive messages to and from contact 14. Additionally, a message is presented indicating that the contact is new, or that a presence subscription to the contact is new.

Contact 3 is presented as a result of an invitation sent by the user to Contact 3. For instance, the invitation may have been sent using invitation process 650. This contact is provided with an invite link 8003 that when clicked will send, for example, an email to the contact with an invitation to subscribe. The icon next to Contact 3 is a hollow ball (or any other suitable indicia) to indicate that Contact 3 is not yet subscribed (Pending Out).

Referring to FIG. 8B, in another embodiment, displayed list of contacts 8006 in display region 8004 includes a contact, Contact 1, that has asked to be added to the user's contact list 8006. Contact 1 is associated with an adjacent icon (e.g., a hollow ball or different color ball) to alert the user that Contact 1 is not yet subscribed (Pending In). In some embodiments, Contact 1 is provided with options 8005 corresponding to the contact types described with respect to FIG. 7. The user can add, reject and/or block Contact 1 by clicking on a corresponding input mechanism. In some embodiments, the input mechanism could be a touch interface. In other embodiments, the input mechanism (e.g., a link) can be in an email sent to the user.

Relevance Boost

Whenever a contact is auto-subscribed it may be desirable to present the contact at the top of the user's contact list for a period of time to direct the user's attention to the new contact. In some embodiments, this "boost" can be accomplished by identifying new contacts (e.g., via the new field 714 in FIG. 7) and applying a boost factor or weight to the contact's communication activity score (e.g., the short-term score 438 is set equal to the boost factor). In some embodiments, the boost factor is selected so as to ensure that the new contact is display at or near the top of the user's quick list of contacts. For example, the boost factor may be set equal to the greater of a default boost value and the highest short-term score of any contact in the user's contact list. The new contacts can then be presented in a display region at a location and/or in a manner that captures the user's attention, such as placing the subscription at the top of the user's contact list. In some embodiments, the short-term score is designed to decay quickly over a period of one or more days, so that boost factor will have little contribution to the communication activity score for the new contact after the passage of a few days.

The disclosed embodiments are not intended to be exhaustive or limited to the precise forms disclosed. Many modifications and variations to the disclosed embodiments are possible in view of the above teachings.

What is claimed is:

1. A method of managing presence subscriptions for messaging services, comprising,
    at a computer system having one or more processors and memory:
        identifying a set of contacts with respect to an identified user;
        applying one or more subscription rules to the contacts;
        selecting a subset of the contacts based on the one or more subscription rules; and
        automatically establishing a presence subscription for each contact in the subset of contacts, wherein a presence subscription for a respective contact enables displaying to the identified user an indication of the online status of the respective contact.

2. The method of claim 1, wherein the set of contacts are identified from email contacts.

3. The method of claim 1, where applying subscription rules to the contacts and selecting a subset of contacts further comprises:
   determining a respective communication activity score for each of a plurality of the contacts; and
   selecting the subset of contacts based on the respective communication activity scores.

4. The method of claim 3, wherein the respective communication activity score for a respective contact is based at least in part on frequency of email communications with the respective contact.

5. The method of claim 4, wherein the selecting includes identifying a "top N" set of contacts based on frequency of email communications with the contacts.

6. The method of claim 5, wherein the parameter N is adjustable.

7. The method of claim 3, wherein selecting the subset of contacts includes excluding contacts that have previously rejected a presence subscription invitation.

8. The method of claim 3, wherein selecting the subset of contacts includes excluding contacts for which the user has previously rejected a presence subscription invitation.

9. The method of claim 3, wherein the respective communication activity score for a respective contact is boosted based on at least one attribute of the respective contact.

10. The method of claim 3, further comprising:
    determining a contact type for a contact; and
    determining, based on the contact type, whether or not to present the contact in a display region.

11. The method of claim 1, further comprising:
    associating a subscription state with a contact; and
    determining, based on the subscription state, whether or not to present the contact in a display region.

12. The method of claim 1, further comprising:
    moving a contact from a first subscription state to a second subscription state based on the one or more subscription rules.

13. A non-transitory computer-readable storage medium having stored thereon instructions, which, when executed by a processor in a system for managing presence subscriptions, cause the processor to perform the operations of:
    identifying a set of contacts with respect to an identifier user;
    applying one or more subscription rules to the contacts;
    selecting a subset of the contacts based on the one or more subscription rules; and
    automatically establishing a presence subscription for each contact in the subset of contacts, wherein a presence subscription for a respective contact enables displaying to the identified user an indication of the online status of the respective contact.

14. The computer-readable storage medium of claim 13, wherein the set of contacts are identified from email contacts.

15. The computer-readable storage medium of claim 13, where applying subscription rules to the contacts and selecting a subset of contacts further comprises:
    determining a respective communication activity score for each of a plurality of the contacts; and
    selecting the subset of contacts based on the respective communication activity scores.

16. The computer-readable storage medium of claim 15, wherein the respective communication activity score for a respective contact is based at least in part on frequency of email communications with the respective contact.

17. The computer-readable storage medium of claim 16, wherein the selecting includes identifying the top N contacts based on frequency of email communications with the contacts.

18. The computer-readable storage medium of claim 17, wherein the parameter N is adjustable.

19. The computer-readable storage medium of claim 15, wherein selecting the subset of contacts includes excluding contacts that have previously rejected a presence subscription invitation.

20. The computer-readable storage medium of claim 15, wherein selecting the subset of contacts includes excluding contacts for which the user has previously rejected a presence subscription invitation.

21. The computer-readable storage medium of claim 15, wherein the respective communication activity score for a respective contact is boosted based on at least one attribute of the respective contact.

22. The computer-readable storage medium of claim 15, further comprising instructions, which, when executed by the processor, cause the processor to perform the operations of:
    determining a contact type for a contact; and
    determining, based on the contact type, whether or not to present the contact in a display region.

23. The computer-readable storage medium of claim 13, further comprising instructions, which, when executed by the processor, cause the processor to perform the operations of:
    associating a subscription state with a contact; and
    determining, based on the subscription state, whether or not to present the contact in a display region.

24. The computer-readable storage medium of claim 13, further comprising instructions, which, when executed by the processor, cause the processor to perform the operations of:
    moving a contact from a first subscription state to a second subscription state based on the one or more subscription rules.

* * * * *